US011545032B2

(12) United States Patent
Hisanaga et al.

(10) Patent No.: US 11,545,032 B2
(45) Date of Patent: Jan. 3, 2023

(54) ROADSIDE APPARATUS AND VEHICLE-SIDE APPARATUS FOR ROAD-TO-VEHICLE COMMUNICATION, AND ROAD-TO-VEHICLE COMMUNICATION SYSTEM

(71) Applicant: SONY CORPORATION, Tokyo (JP)

(72) Inventors: Kenji Hisanaga, Tokyo (JP); Kenji Ogawa, Tokyo (JP); Kazufumi Cho, Tokyo (JP); Akihiko Izumi, Tokyo (JP); Taichi Shimoyashiki, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 17/056,614

(22) PCT Filed: May 13, 2019

(86) PCT No.: PCT/JP2019/018892

§ 371 (c)(1),
(2) Date: Nov. 18, 2020

(87) PCT Pub. No.: WO2019/225371

PCT Pub. Date: Nov. 28, 2019

(65) Prior Publication Data

US 2021/0209949 A1 Jul. 8, 2021

(30) Foreign Application Priority Data

May 25, 2018 (JP) ............................ JP2018-100914

(51) Int. Cl.
*H04W 4/44* (2018.01)
*G08G 1/16* (2006.01)
*G08G 1/09* (2006.01)

(52) U.S. Cl.
CPC ................ *G08G 1/16* (2013.01); *G08G 1/09* (2013.01)

(58) Field of Classification Search
None
See application file for complete search history.

(56) References Cited

U.S. PATENT DOCUMENTS 5,708,425 A * 1/1998 Dwyer .................. G08G 1/017 340/928
2009/0140881 A1 6/2009 Sakai et al.
(Continued)

FOREIGN PATENT DOCUMENTS

CN 101046390 A 10/2007

OTHER PUBLICATIONS

International Search Report and Written Opinion of PCT Application No. PCT/JP2019/018892, dated Jun. 25, 2019, 09 pages of ISRWO.

(Continued)

*Primary Examiner* — Brent Swarthout
(74) *Attorney, Agent, or Firm* — Chip Law Group

(57) ABSTRACT

This system includes a roadside apparatus and a vehicle-side apparatus. The roadside apparatus includes a roadside sensor that detects a road situation, a recognizer that recognizes a traffic object from the road situation detected by the roadside sensor and converts a result of the recognition into stereotype information of the traffic object, and a transmitter that transmits and receives the stereotype information. The vehicle-side apparatus includes a data storage unit that stores data regarding a traffic object corresponding to the stereotype information, a receiver that receives the stereotype information transmitted by the roadside apparatus, and a presentation unit that presents the data stored in the data storage unit on the basis of the received stereotype information.

12 Claims, 18 Drawing Sheets

100 Road-to-vehicle communication system

(56) References Cited

U.S. PATENT DOCUMENTS

| | | | | |
|---|---|---|---|---|
| 2011/0006914 | A1* | 1/2011 | Tsuda | H04W 16/30 340/905 |
| 2015/0279209 | A1* | 10/2015 | Borton | G08G 1/02 377/9 |
| 2017/0129401 | A1* | 5/2017 | Matsuoka | B60Q 9/008 |
| 2017/0256166 | A1 | 9/2017 | Nishiyama et al. | |
| 2018/0053413 | A1* | 2/2018 | Patil | G08G 1/0969 |
| 2019/0179010 | A1* | 6/2019 | Nasser | G01S 13/931 |

OTHER PUBLICATIONS

Office Action for CN Patent Application No. 201980033398.X, dated Jun. 22, 2022, 13 pages of English Translation and 10 pages of Office Action.

* cited by examiner

ROADSIDE APPARATUS AND VEHICLE-SIDE APPARATUS FOR ROAD-TO-VEHICLE COMMUNICATION, AND ROAD-TO-VEHICLE COMMUNICATION SYSTEM

CROSS REFERENCE TO RELATED APPLICATIONS

This application is a U.S. National Phase of International Patent Application No. PCT/JP2019/018892 filed on May 13, 2019, which claims priority benefit of Japanese Patent Application No. JP 2018-100914 filed in the Japan Patent Office on May 25, 2018. Each of the above-referenced applications is hereby incorporated herein by reference in its entirety.

TECHNICAL FIELD

The present technology relates to a roadside apparatus that detects and transmits a traffic situation, a vehicle-side apparatus that receives a detection result of the traffic situation and presents the detection result to a user, and a road-to-vehicle communication system.

BACKGROUND ART

In a road-to-vehicle communication system in which, for example, traffic situations at intersections and the like are detected by a roadside apparatus, and detection results are transmitted to a vehicle-side apparatus of each vehicle to be presented to drivers, it is important to present real-time traffic situations as much as possible. In this regard, various techniques for high-speed data communication between roads and vehicles have been proposed.

CITATION LIST

Patent Literature

Patent Literature 1: Japanese Patent Application Laid-open No. 2016-018407

Patent Literature 2: Japanese Patent Application Laid-open No. 2014-071831

Patent Literature 3: Japanese Patent Application Laid-open No. 2012-226535

Patent Literature 4: Japanese Patent Application Laid-open No. 2012-203721

Patent Literature 5: Japanese Patent Application Laid-open No. 2012-088922

Patent Literature 6: Japanese Patent Application Laid-open No. 2009-201028

Patent Literature 7: Japanese Patent Application Laid-open No. 2002-261685

Patent Literature 8: Japanese Patent Application Laid-open No. HEI 11-167695

DISCLOSURE OF INVENTION

Technical Problem

In order to present the detection result of the traffic situation to the driver as comprehensibly as possible in the vehicle-side apparatus, it is necessary to present data with a relatively large amount of information such as images and synthetic sounds. However, if the data is simply presented by using images and synthetic sounds, the images and synthetic sounds without variations make the expressiveness of information transmission poor, and the amount of information that can be transmitted to the driver is limited. So, if various traffic situations that change from time to time are presented to the driver by using various types of images and synthetic sounds, the amount of communication between roads and vehicles tends to increase. In other words, in order to present various traffic situations with a large amount of information in the vehicle-side apparatus via road-to-vehicle communication, there are various problems to be technically solved.

It is an object of the present technology to provide a roadside apparatus and a vehicle-side apparatus for road-to-vehicle communication, and a road-to-vehicle communication system, which are capable of communicating road traffic situations at high speed with a large amount of information while suppressing the amount of data communication.

Solution to Problem

In order to solve the above problems, a roadside apparatus for road-to-vehicle communication of an embodiment according to the present technology includes: a roadside sensor that detects a road situation; a recognizer that recognizes a traffic object from the road situation detected by the roadside sensor and converts a result of the recognition into stereotype information of the traffic object; and a transmitter that transmits and receives the stereotype information.

In the roadside apparatus for road-to-vehicle communication, the recognizer may further recognize a position and a displacement amount of the traffic object.

In the roadside apparatus for road-to-vehicle communication, the transmitter may receive the stereotype information from a vehicle in the road situation.

In the roadside apparatus for road-to-vehicle communication, the roadside sensor may include a microphone, and the recognizer may recognize a sound source of a sound detected by the microphone and convert a result of the recognition into stereotype information of the sound source.

In the roadside apparatus for road-to-vehicle communication, the recognizer may recognize a displacement or a state of a partial structure of the traffic object and convert a result of the recognition into the stereotype information.

In the roadside apparatus for road-to-vehicle communication, the displacement or the state of the partial structure of the traffic object may be one of a head-swinging motion of a driver, a steering direction, a direction of a tire, and a state of a direction indicator in a case where the traffic object is a vehicle.

In the roadside apparatus for road-to-vehicle communication, the displacement or the state of the partial structure of the traffic object may be a direction of a face of a rider in a case where the traffic object is a bicycle.

A vehicle-side apparatus for road-to-vehicle communication of another embodiment according to the present technology includes: a data storage unit that stores data regarding a traffic object corresponding to stereotype information; a receiver that receives the stereotype information; and a presentation unit that presents the data stored in the data storage unit on the basis of the received stereotype information.

In the vehicle-side apparatus for road-to-vehicle communication, the presentation unit may present the data on a windshield of a vehicle.

In the vehicle-side apparatus for road-to-vehicle communication, the presentation unit may present the data on a door mirror of a vehicle.

In the vehicle-side apparatus for road-to-vehicle communication, the receiver may receive a stereotype ID of a sound source, and the presentation unit may present a synthetic sound corresponding to the received stereotype ID of the sound source.

In the vehicle-side apparatus for road-to-vehicle communication, the receiver may receive displacement information of the traffic object, and the presentation unit may vary the synthetic sound on the basis of the received displacement information.

In the vehicle-side apparatus for road-to-vehicle communication, the receiver may receive displacement information of the traffic object, and the presentation unit may present the data stored in the data storage unit on the basis of the received stereotype information and the displacement information.

In addition, a road-to-vehicle communication system of still another embodiment according to the present technology includes: a roadside apparatus including a roadside sensor that detects a road situation, a recognizer that recognizes a traffic object from the road situation detected by the roadside sensor and converts a result of the recognition into stereotype information of the traffic object, and a transmitter that transmits and receives the stereotype information; and a vehicle-side apparatus including a data storage unit that stores data regarding a traffic object corresponding to the stereotype information, a receiver that receives the stereotype information transmitted by the roadside apparatus, and a presentation unit that presents the data stored in the data storage unit on the basis of the received stereotype information.

Advantageous Effects of Invention

As described above, according to the present technology, it is possible to communicate road traffic situations at high speed with a large amount of information while suppressing the amount of data communication.

MODE(S) FOR CARRYING OUT THE INVENTION

Embodiments according to the present technology will be described below.

First Embodiment

Figure 1:
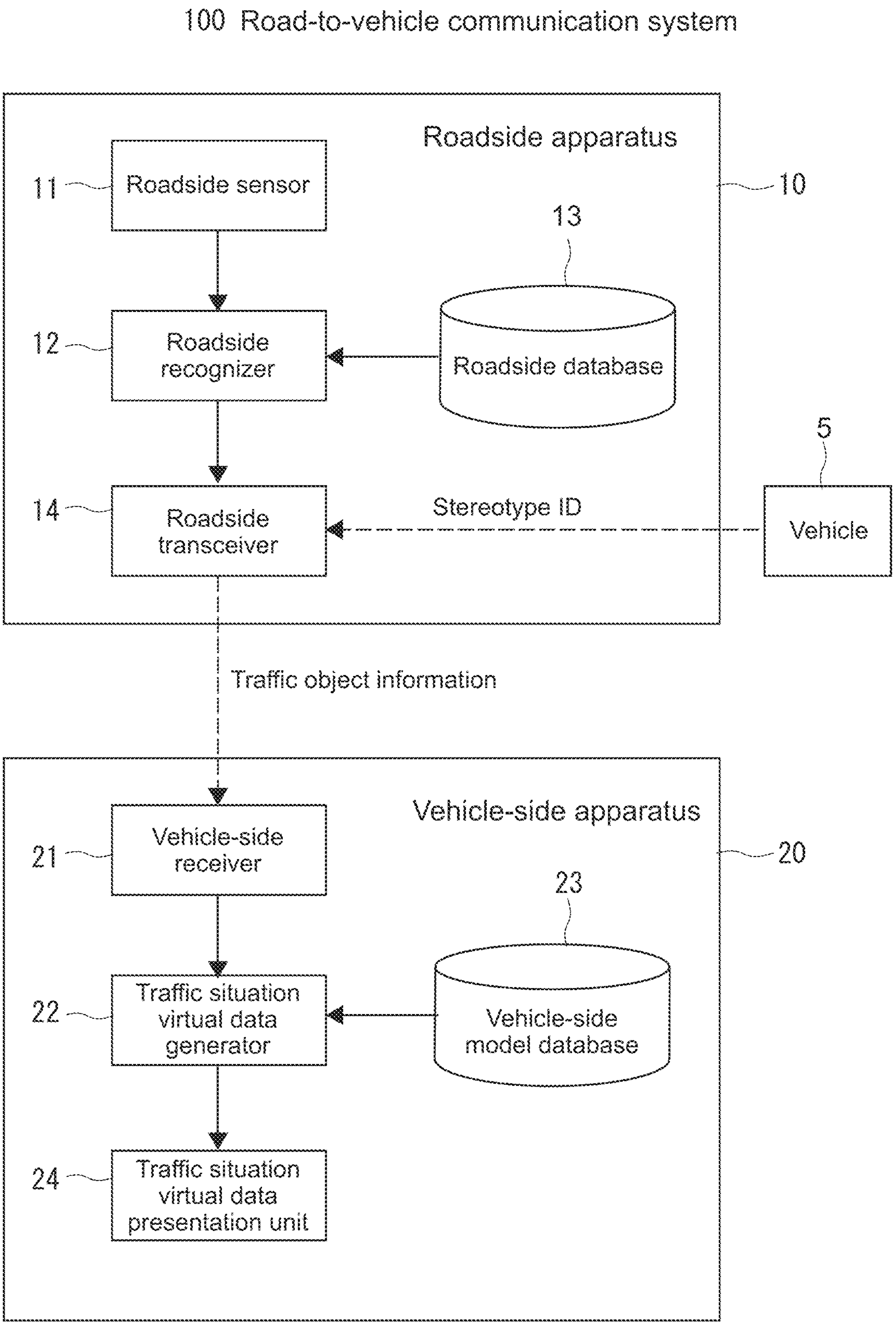
FIG. 1 is a block diagram showing a configuration of a road-to-vehicle communication system of a first embodiment according to the present technology.

FIG. 1 is a block diagram showing a configuration of a road-to-vehicle communication system of a first embodiment according to the present technology.

This embodiment relates to a road-to-vehicle communication system 100 including a roadside apparatus 10 and a vehicle-side apparatus 20. The roadside apparatus 10 includes a roadside sensor 11 that detects a road situation, a roadside recognizer 12 that recognizes information regarding a traffic object from the road situation detected by the roadside sensor 11 and converts a recognition result into a stereotype ID, and a roadside transceiver 14 that transmits and receives the stereotype ID.

Meanwhile, the vehicle-side apparatus 20 includes a vehicle-side model database 23 that stores data corresponding to the stereotype ID, a vehicle-side receiver 21 that receives the stereotype ID, and a traffic situation virtual data generator 22 and a traffic situation virtual data presentation unit 24 that present data of the vehicle-side model database 23 on the basis of the received stereotype ID.

Next, details of the roadside apparatus 10 in the road-to-vehicle communication system 100 of this embodiment will be described.

As shown in FIG. 1, the roadside apparatus 10 includes a roadside sensor 11, a roadside recognizer 12, a roadside database 13, and a roadside transceiver 14.

The roadside sensor 11 is a sensor that physically detects a traffic situation in a specific road area including an intersection. More specifically, the roadside sensor 11 is a camera, a microphone, or the like. The specific road area including an intersection is referred to simply as an "intersection" herein.

The roadside recognizer 12 recognizes a stereotype of an traffic object and a stereotype of a sound source from information such as an image and a sound detected by the roadside sensor 11, and thus generates a stereotype ID of the traffic object and a stereotype ID of the sound source. Further, the roadside recognizer 12 generates displacement information such as a position, a moving direction, a speed, and acceleration of the traffic object from the information such as an image and a sound detected by the roadside sensor 11. The stereotype ID of the traffic object, the stereotype ID of the sound source, and the displacement information, which are generated by the roadside recognizer 12, are referred to as "traffic object information" herein. An intersection ID for identifying an intersection or the like is also added to the traffic object information.

The roadside recognizer 12 includes a central processing unit (CPU), a main memory including a random access memory (RAM) or the like, a read only memory (ROM) that stores data or the like necessary for executing a program by the CPU, and the like.

The roadside database 13 is a database that stores an image feature amount for each stereotype of a traffic object, a sound feature amount for each stereotype of a sound source, and the like, which are necessary for the roadside recognizer 12 to recognize a stereotype of the traffic object or a stereotype of the sound source from images, sounds, and the like detected by the roadside sensor 11. The roadside database 13 includes, for example, a hard disk drive (HDD), a solid state drive (SSD), and the like.

The roadside transceiver 14 wirelessly transmits the traffic object information generated by the roadside recognizer 12 to the vehicle-side apparatus 20. Further, when a stereotype ID of a traffic object of a vehicle 5 in the traffic situation is transmitted from the vehicle 5, the roadside transceiver 14 is capable of receiving that stereotype ID and skipping recognition of the stereotype of that vehicle.

(Configuration of Vehicle-Side Apparatus 20)

The vehicle-side apparatus 20 includes a vehicle-side receiver 21, a traffic situation virtual data generator 22, a vehicle-side model database 23, a traffic situation virtual data presentation unit 24, and the like.

The vehicle-side receiver 21 receives the traffic object information wirelessly transmitted from the roadside apparatus 10.

The traffic situation virtual data generator 22 generates traffic situation virtual data on the basis of the traffic object information received by the vehicle-side receiver 21, and intersection model data, traffic object model data, sound source sound model data, and the like stored in the vehicle-side model database 23. The traffic situation virtual data generator 22 includes a central processing unit (CPU), a main memory including a random access memory (RAM) or the like, a read only memory (ROM) that stores data or the like necessary for executing a program by the CPU, and the like.

The vehicle-side model database 23 is a database that stores intersection model data for each intersection ID, traffic object model data for each stereotype ID of a traffic object, sound source sound model data for each stereotype ID of a sound source, and the like, which are necessary for generating the traffic situation virtual data. The vehicle-side model database 23 includes, for example, a hard disk drive (HDD), a solid state drive (SSD), and the like.

The traffic situation virtual data presentation unit 24 presents the traffic situation virtual data generated by the traffic situation virtual data generator 22 to a driver of a user vehicle.

(Traffic Object Information)

The traffic object information includes a stereotype ID of a traffic object, a stereotype ID of a sound source, displacement information, an intersection ID, and the like.

The stereotype ID of the traffic object is an ID indicating the classification of the traffic object by using the stereotype. Examples of the stereotype of the traffic object include "emergency vehicle", "large-sized vehicle", "medium-sized vehicle", "small-sized vehicle", "high-speed vehicle", "two-wheeled vehicle", and "pedestrian". Those stereotypes of the traffic object may be classified more finely. For example, the "emergency vehicle" may be classified into "ambulance", "fire engine", "police vehicle", and the like. The "large-sized vehicle" may be classified into "bus", "truck", "trailer", and the like. The "medium-sized vehicle" may be classified into "van", "large sedan", and the like. The "small-sized vehicle" may be classified into "light car", "auto-rickshaw", and the like. The "two-wheeled vehicle" may be classified into "motorcycle", "bicycle", and the like. The "pedestrian" may be classified into "adult", "child", "stroller", and the like.

The stereotype ID of the sound source is an ID indicating the classification of the sound source associated with the traffic object by using the stereotype.

The displacement information includes information such as a position, a moving direction, a speed, and acceleration of the traffic object.

Information on the position of the traffic object is given by a relative positional relationship with an intersection. Information on the moving direction is given by moving direction IDs respectively assigned to upbound and downbound directions. Information on the speed is given by a speed ID assigned to each predetermined speed segment. Information on the acceleration is also given by an acceleration ID assigned to each predetermined acceleration segment.

The intersection ID is information for identifying each intersection.

As described above, in all IDs used in the traffic object information, information contents are associated with values of the respective IDs on a one-to-one basis. Thus, the amount of data communicated from the roadside apparatus 10 to the vehicle-side apparatus 20 is totally smaller than in a method of transmitting image data and sound data or a method of transmitting structured data.

(Regarding Model Data)

The traffic object model data may be an illustration image in which an appearance feature for each stereotype is reflected in an iconic manner to such an extent that a user can distinguish the stereotype of the traffic object at a glance. For example, the model data of the "emergency vehicle" may be an illustration image of "ambulance", "fire engine", "police vehicle", or the like. The model data of the "high-speed vehicle" may be, for example, an illustration image of "sports car", "racing car", or the like.

The intersection model data includes an illustration image or the like obtained in a case where the intersection is viewed from the driver of the user vehicle.

The sound source sound model data may be a sound or the like that reflects a feature for each stereotype to such an extent that the user can easily distinguish the stereotype of the sound source at a glance.

(Operation of Road-to-Vehicle Communication System 100)

Next, the operation of the road-to-vehicle communication system 100 of this embodiment will be described.

(Operation of Roadside Apparatus 10)

Figure 2:
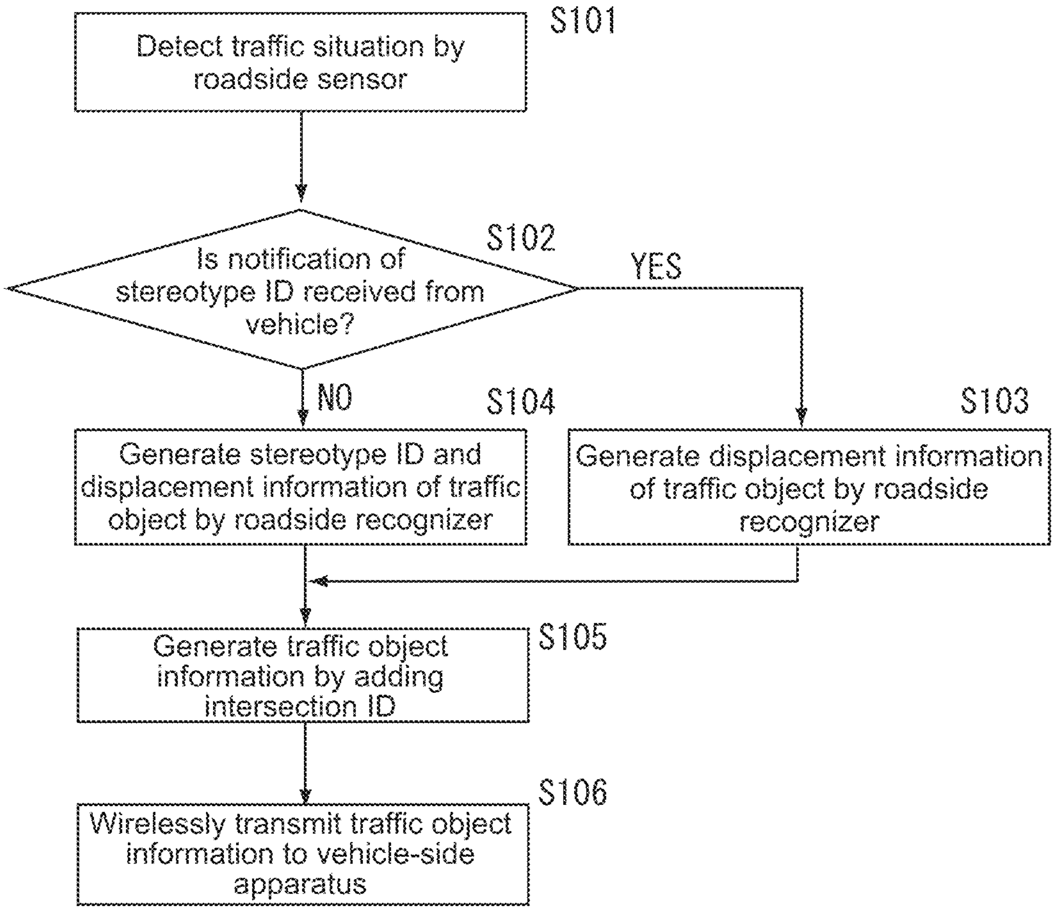
FIG. 2 is a flowchart of the operation of a roadside apparatus 10 in the road-to-vehicle communication system 100 of FIG. 1.

FIG. 2 is a flowchart of the operation of the roadside apparatus 10 in the road-to-vehicle communication system 100 of this embodiment. Note that it is assumed here that a camera is used as the roadside sensor 11.

In the roadside apparatus 10, the roadside sensor 11 (camera) detects a traffic situation around an intersection (Step S101). The roadside recognizer 12 acquires a stereotype ID of a traffic object approaching the intersection. The method of acquiring the stereotype ID of the traffic object approaching the intersection includes a method of receiving a stereotype ID notified from a vehicle and a method of recognizing a stereotype of that vehicle from an image captured by the roadside sensor 11 (camera) and acquiring a stereotype ID.

When receiving a notification of a stereotype ID from a vehicle (Yes in Step S102), the roadside recognizer 12 generates displacement information of the vehicle from the image captured by the roadside sensors 11 (camera) (Step S103), and generates traffic object information that collects the displacement information, the stereotype ID, and the intersection ID (Step S105).

Further, for a traffic object for which a notification of a stereotype ID is not issued (NO in Step S102), the roadside recognizer 12 generates a stereotype ID and displacement information of such a traffic object from the image captured by the roadside sensors 11 (camera) (Step S104), and adds the intersection ID to the stereotype ID and the displacement information to generate traffic object information (Step S105).

Here, the displacement information such as a speed and acceleration of the traffic object may be calculated on the basis of, for example, the displacement amount of the image of the traffic object in images captured at a plurality of timings by the roadside sensor 11 (camera).

The traffic object information generated by the roadside recognizer 12 is wirelessly transmitted to the vehicle-side apparatus 20 by the roadside transceiver 14 (Step S106).

Although the case where the roadside sensor 11 of the roadside apparatus 10 is a camera and the stereotype ID and the displacement information of the traffic object are generated from the image captured by the camera has been described here, if the roadside sensor 11 is a microphone, it is also possible to generate the stereotype ID and the displacement information of the traffic object from a sound detected by the microphone. Alternatively, the stereotype ID and the displacement information of the traffic object may be generated using both the camera and the microphone.

(Operation of Vehicle-Side Apparatus 20)

Next, the operation of the vehicle-side apparatus 20 will be described.

Figure 3:
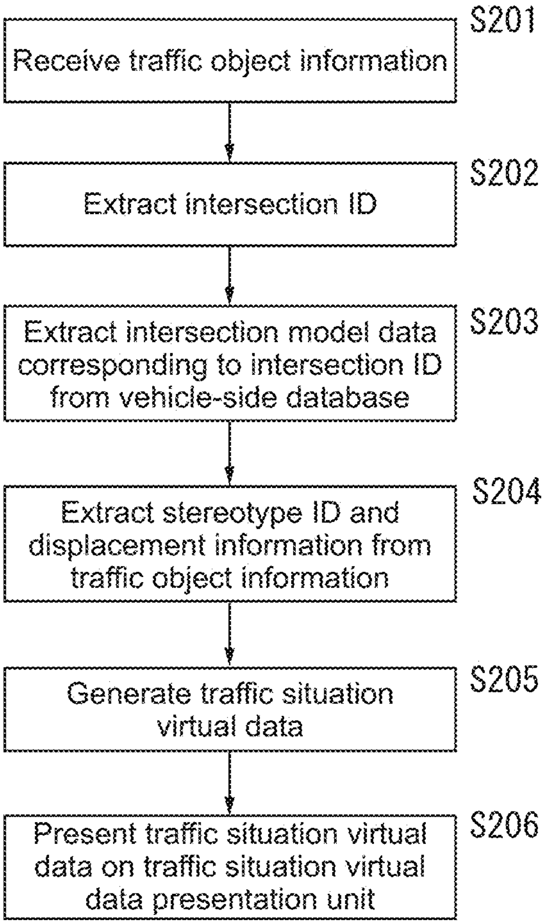
FIG. 3 is a flowchart of the operation of a vehicle-side apparatus 20 in the road-to-vehicle communication system 100 of FIG. 1.

FIG. 3 is a flowchart of the operation of the vehicle-side apparatus 20 in the road-to-vehicle communication system 100 of this embodiment.

When entering an area communicable with the roadside apparatus 10, the vehicle-side apparatus 20 receives the traffic object information wirelessly transmitted from the roadside apparatus 10 (Step S201). The received traffic object information is supplied to the traffic situation virtual data generator 22.

The traffic situation virtual data generator 22 extracts the intersection ID from the acquired traffic object information (Step S202). The traffic situation virtual data generator 22 reads intersection model data corresponding to the extracted intersection ID from the vehicle-side model database 23 (Step S203).

Next, the traffic situation virtual data generator 22 extracts the stereotype ID and the displacement information from the traffic object information (Step S204). The traffic situation virtual data generator 22 reads traffic object model data corresponding to the extracted stereotype ID from the vehicle-side model database 23. The traffic situation virtual data generator 22 generates traffic situation virtual data on the basis of the traffic object model data, the displacement information, and the intersection model data (Step S205), and presents the traffic situation virtual data on the traffic situation virtual data presentation unit 24 (Step S206).

(Specific Example of Traffic Situation Virtual Data Generation)

Figure 4:
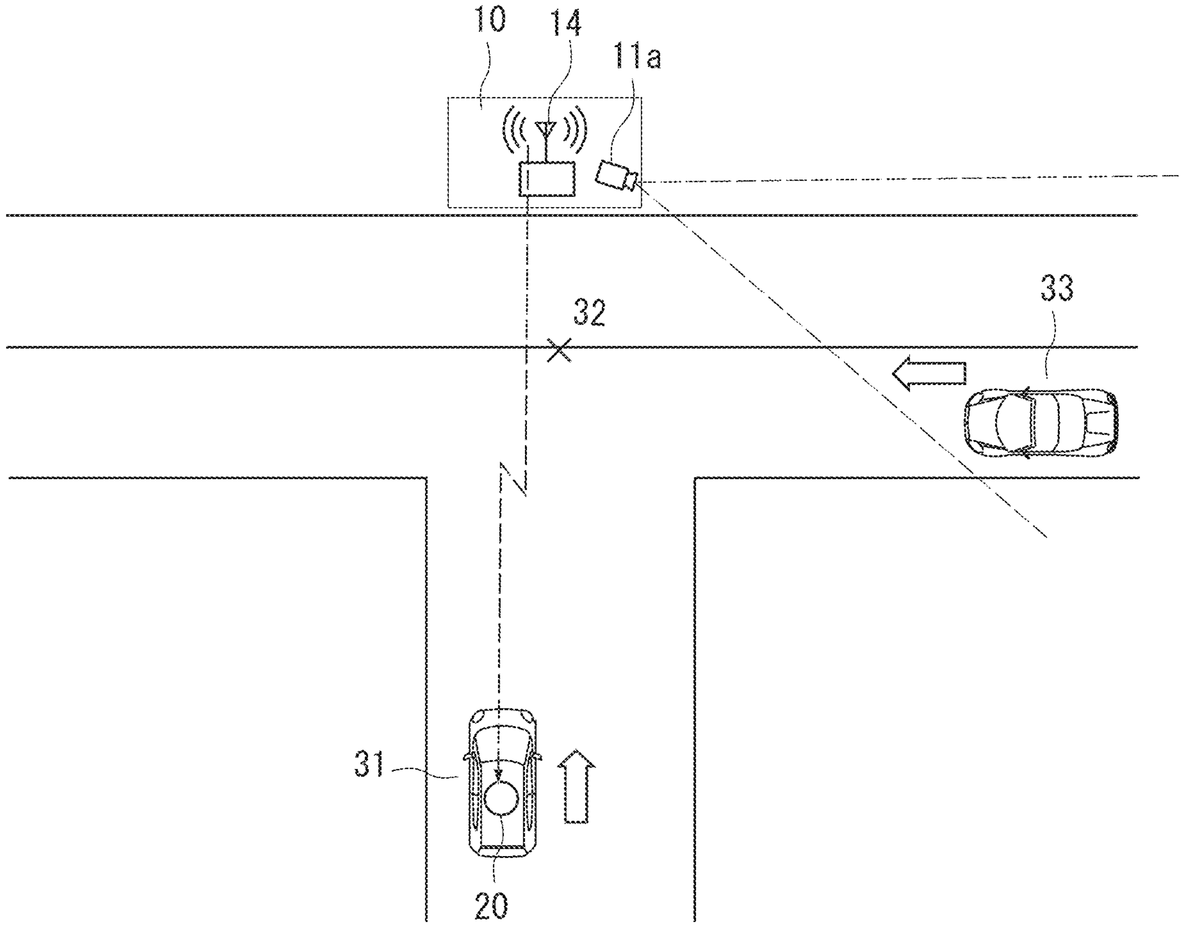
FIG. 4 is a diagram showing an example of a first traffic situation around an intersection detected by the roadside apparatus.

FIG. 4 is a diagram showing an example of a first traffic situation around an intersection detected by the roadside apparatus 10.

Now, a user vehicle 31 that is a vehicle equipped with the vehicle-side apparatus 20 is about to enter an intersection 32 from the bottom toward the top of the figure. Meanwhile, a vehicle (medium-sized vehicle) 33 that is a traffic object to be detected is about to enter the intersection 32 from the right side of the figure.

The roadside apparatus 10 generates traffic object information including the stereotype ID and the displacement information of the vehicle 33 approaching the intersection 32 and the intersection ID of the intersection 32 from an image captured by a camera 11*a*, and wirelessly transmits the traffic object information to the vehicle-side apparatus 20 of the user vehicle 31 using the roadside transceiver 14. Here, the stereotype of the vehicle 33 is assumed as a "medium-sized vehicle".

The vehicle-side apparatus 20 of the user vehicle 31 reads intersection model data of the intersection 32 from the vehicle-side model database 23 on the basis of the intersection ID included in the received traffic object information. Subsequently, the traffic situation virtual data generator 22 reads traffic object model data of the medium-sized vehicle from the vehicle-side model database 23 on the basis of the stereotype ID included in the traffic object information. The traffic situation virtual data presentation unit 24 then generates traffic situation virtual data on the basis of the intersection model data of the intersection 32, the traffic object model data of the medium-sized vehicle, and the displacement information, and presents the traffic situation virtual data on the traffic situation virtual data presentation unit 24.

Figure 5:
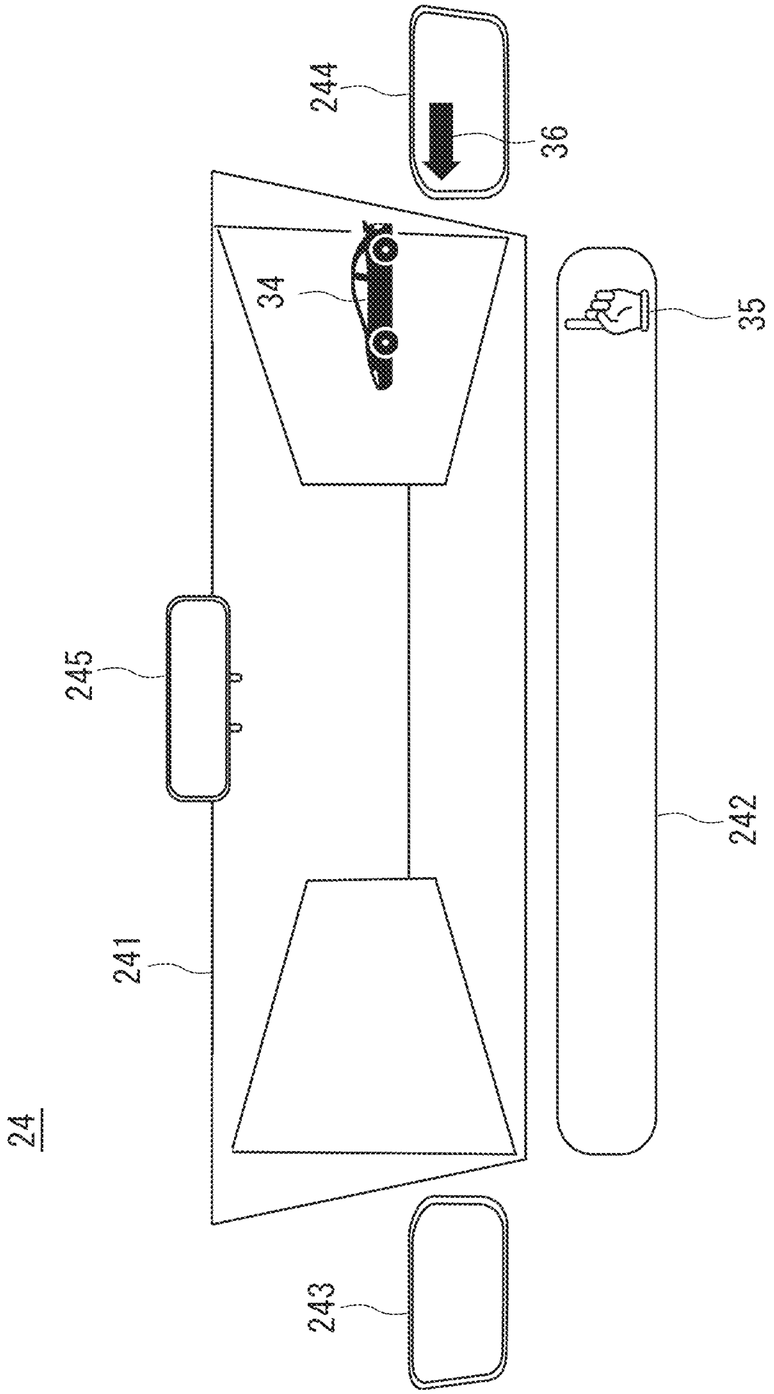
FIG. 5 is a diagram showing a configuration of a traffic situation virtual data presentation unit 24 and a presentation example of traffic situation virtual data.

FIG. 5 is a diagram showing a configuration of the traffic situation virtual data presentation unit 24 and a presentation example of the traffic situation virtual data.

As shown in the figure, the traffic situation virtual data presentation unit 24 includes a plurality of monitors such as a windshield monitor 241, a meter panel monitor 242, left and right door mirror monitors 243 and 244, a rearview mirror monitor 245, and a display monitor (not shown) of a car navigation system.

The windshield monitor 241 may include, for example, a reflective or transmissive transparent screen disposed on the windshield surface, and a projector that performs projection onto the transparent screen. For example, a display device such as a liquid crystal display or an indicator for presenting the traffic situation virtual data is disposed in the meter panel monitor 242, the left and right door mirror monitors 243 and 244, and the rearview mirror monitor 245. In addition, the traffic situation virtual data presentation unit 24 includes a speaker system (not shown) for presenting the traffic situation virtual data represented by sounds such as a siren sound and an engine sound. It is desirable for the speaker system to be a stereo acoustic system capable of outputting a stereo sound generated by localization of sound.

The traffic situation virtual data generated using the intersection model data and the traffic object model data of the medium-sized vehicle 33 is presented on the windshield monitor 241. The traffic situation is presented in such a manner on the windshield monitor 241 with an abundant amount of image-based information, and thus the driver of the user vehicle 31 can grasp at a glance that the medium-sized vehicle 33 is entering the intersection 32 from the right side. Further, since the traffic object information wirelessly transmitted from the roadside apparatus 10 to the vehicle-side apparatus 20 is mainly a group of IDs, the amount of data communication can be suppressed to a very low level. Therefore, high-speed communication becomes possible, and the traffic situation with high real-time property can be presented in the vehicle-side apparatus 20. It is also possible to simultaneously communicate data to many user vehicles at high speed.

(Acquisition of Traffic Situation Virtual Data Generation)

1. The vehicle-side model database 23 stores traffic object model data associated with a stereotype ID of a traffic object. The traffic situation virtual data generator 22 generates traffic situation virtual data on the basis of the traffic object model data, intersection model data, positional information and information of a movement direction included in displacement information, and the like.

2. Specifically, for example, intersection model data of a portion corresponding to a real space within a predetermined azimuth angle from the driver's viewpoint of the user vehicle 31, and traffic object model data of a traffic object existing in the real space may be presented on the windshield monitor 241.

3. Even if the traffic object exists outside the real space within a predetermined azimuth angle from the driver's viewpoint of the user vehicle 31, the traffic object model data of the traffic object may be presented on the traffic situation virtual data presentation unit 24 depending on the speed, the acceleration, or the stereotype ID of the traffic object. For example, a traffic object (such as a high-speed vehicle) whose speed or acceleration exceeds each threshold value thereof or a traffic object whose stereotype ID is an emergency vehicle is preferably presented on the traffic situation virtual data presentation unit 24 even if such a traffic object exists outside the real space. Here, the threshold value of the speed may be a legal speed, a safety speed determined from accident data for each intersection, or the like.

(Presentation of Traffic Situation on Monitors Other than Windshield Monitor)

Auxiliary information 35 and 36 for supplementing the presented contents of the traffic situation on the windshield monitor 241 are presented on the meter panel monitor 242, the left and right door mirror monitors 243 and 244, and the rearview mirror monitor 245 shown in FIG. 5, the display monitor (not shown) of the car navigation system, and the like. For example, the auxiliary information 35 and 36 indicate that a traffic object having high-speed characteristics, such as a high-speed vehicle or an emergency vehicle, is approaching an intersection, an approaching direction thereof, and the like.

In such a manner, the auxiliary information 35 and 36 for supplementing the presented contents of the traffic situation on the windshield monitor 241 are presented on the meter panel monitor 242, the left and right door mirror monitors 243 and 244, the rearview mirror monitor 245, the display monitor (not shown) of the car navigation system, and the like, and thus the driver of the user vehicle 31 can grasp the traffic situation more reliably and earlier. Note that the auxiliary information 35 and 36 may be an iconic illustration image or character information that allows the driver of the user vehicle 31 to recognize the presented contents at a glance. Alternatively, the auxiliary information 35 and 36 may be a synthetic sound.

Further, a traffic situation of an unnatural position to be presented on the windshield monitor 241 from the driver's viewpoint, for example, a traffic situation of a real space outside a real space within a predetermined azimuth angle from the driver's viewpoint of the user vehicle 31, a traffic situation of the left and right of the user vehicle 31, and a traffic situation behind the user vehicle 31, may be presented on the meter panel monitor 242, the left and right door mirror monitors 243 and 244, the rearview mirror monitor 245, and the display monitor (not shown) of the car navigation system. Thus, the driver can grasp the traffic situation around the user vehicle 31 from the traffic situation virtual data presentation unit 24, and thus the traffic safety can be further improved.

(Presentation Control Based on Intersection Prediction Distance Between User Vehicle and Detected Vehicle)

The traffic situation virtual data generator 22 may predict a distance between the user vehicle 31 and a vehicle whose presence has been notified by the traffic object information from the roadside apparatus 10 (hereinafter, the vehicle will be referred to as "detected vehicle") at the time when one of those vehicles arrives at an intersection (hereinafter, the distance will be referred to as "intersection prediction distance"). When the intersection prediction distance is less than a threshold value, the traffic situation virtual data generator 22 may present the traffic object model data of the vehicle whose presence has been notified by the traffic object information from the roadside apparatus 10 on the traffic situation virtual data presentation unit 24.

Figure 6A:
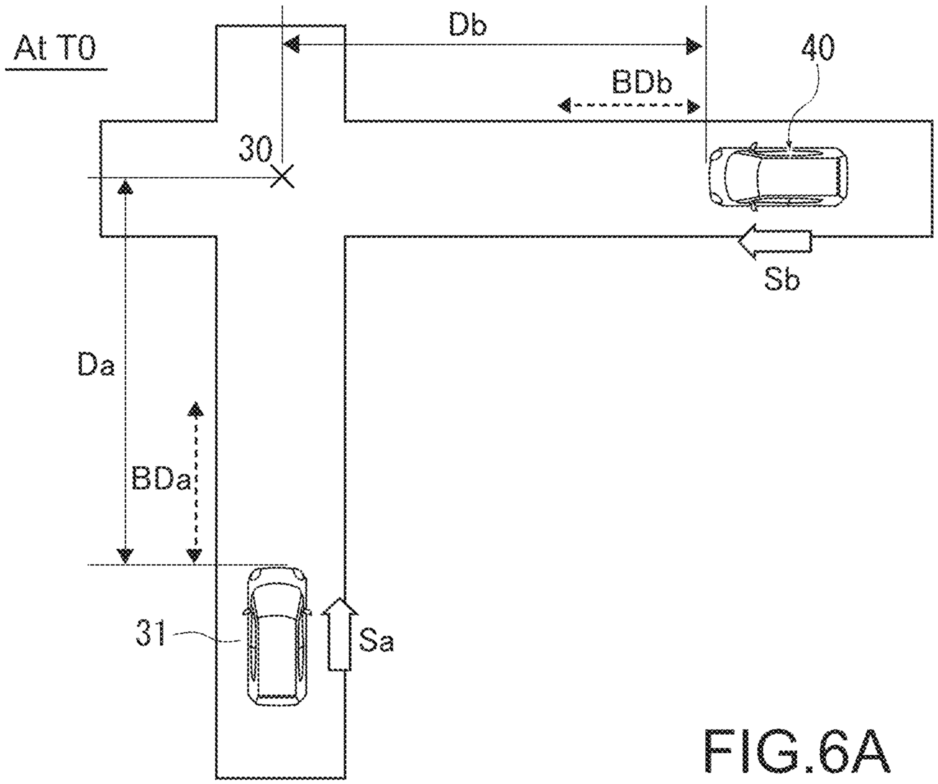
FIG. 6A is a diagram for describing presentation control based on an intersection prediction distance between a user vehicle and a detected vehicle.
Figure 6B:
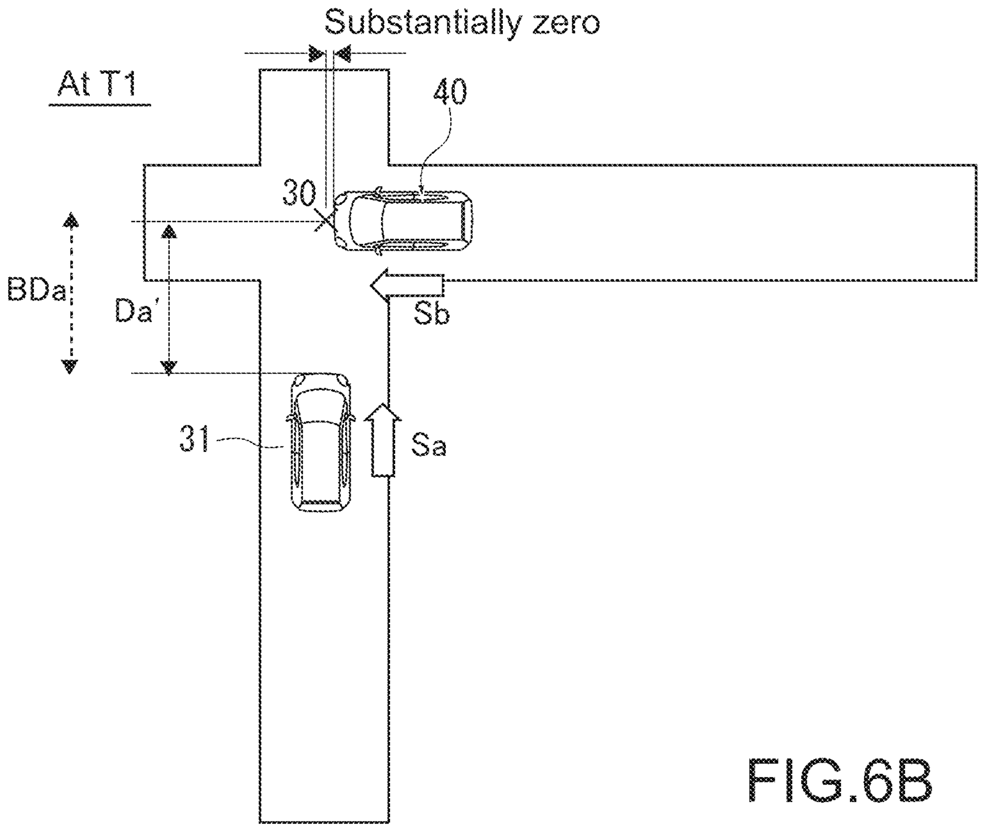
FIG. 6B is also a diagram for describing the presentation control based on the intersection prediction distance between the user vehicle and the detected vehicle.

FIGS. 6A and 6B are diagrams for describing a method of calculating the intersection prediction distance between the user vehicle 31 and a detected vehicle 40. FIG. 6A shows a situation at a certain timing (at T0), Da represents a distance from the user vehicle 31 to the intersection center 30 at T0, Sa represents a speed of the user vehicle 31 at T0, BDa represents a braking distance of the user vehicle 31 for the speed Sa, Db represents a distance from the detected vehicle 40 to the intersection center 30 at T0, Sb represents a speed of the detected vehicle 40 at T0, and BDb represents a braking distance of the detected vehicle 40 for the speed Sb. It is assumed that $Db/Sb<Da/Sa$.

FIG. 6B shows a situation at a timing T1 (at T1) at which the remaining distance Db between the detected vehicle 40 and the intersection center 30 reaches substantially zero. Assuming that the distance between the user vehicle 31 and the intersection center 30 at T1 is Da', when Da' is larger than the braking distance BDa of the user vehicle 31, the traffic situation virtual data generator 22 presents the model data of the detected vehicle and the like on the traffic situation virtual data presentation unit 24.

The vehicle-side model database 23 of the vehicle-side apparatus 20 stores, for example, a speed-braking distance table for each stereotype ID or more detailed vehicle type. The traffic situation virtual data generator 22 reads corresponding braking distance information from the table of the speed-braking distance corresponding to the stereotype ID or detailed vehicle type of the detected vehicle 40, and uses the braking distance information in the above calculation.

Note that the gradient of a road and performance data such as acceleration performance of the vehicle are added to the calculation for the distance, and thus the distance can be calculated with higher accuracy.

In addition, the traffic situation virtual data generator 22 uses a case where Da' is larger than the braking distance BDa of the user vehicle 31 as a determination condition for presenting the traffic object model data. However, it is needless to say that a determination condition with higher safety, for example, a determination condition where a value obtained by multiplying Da' by a coefficient corresponding to a safety factor is larger than BDa, may be adopted. In addition, the determination may be performed on the basis of the ratio between Da' and BDa.

Further, when the traffic object information including bone IDs, which indicate a head-swinging motion of a driver of the detected vehicle, a direction of a tire, a steering direction, a state of a direction indicator, and the like, is transmitted from the roadside apparatus 10 to the vehicle-side apparatus 20, the traffic situation virtual data generator 22 may predict whether or not the detected vehicle is about to change a lane on the basis of those bone IDs and may determine a vehicle, to which attention has to be paid, by taking the prediction result into consideration. Note that the bone ID will be described later.

In addition, the traffic situation virtual data generator 22 may perform the determination described above by taking a feature amount for each intersection into consideration, the feature amount (for example, the number of lanes, the gradient, the accident statistical data, the safety factor data such as good or bad visibility, and the like) being stored in advance in the data storage unit such as the vehicle-side model database 23.

(Presentation Control Based on Stereotype ID of Sound Source and Bone ID)

The traffic object information may include a stereotype ID of the sound source and a bone ID in addition to the stereotype ID of the traffic object described above and the displacement information.

Presentation Control Based on Stereotype ID of Sound Source

The stereotype ID of the sound source is information that identifies the type of a sound source associated with the traffic object. Examples of types of the sound source include a siren sound, an engine sound, a horn sound, a chain sound of a bicycle, and a bell sound. Since the siren sound differs for each type of the emergency vehicles (ambulance, fire engine, police vehicle, etc.), a stereotype ID may be assigned for each type of those emergency vehicles. Since the engine sound differs depending on an engine exhaust volume, an engine type, a vehicle type, and the like, a stereotype ID may be assigned for each type of the engine sound.

The roadside apparatus 10 includes a microphone as the roadside sensor 11 in order to generate a stereotype ID of a sound source existing in a traffic situation. The microphone supplies a detected sound signal to the roadside recognizer 12. The roadside recognizer 12 generates a stereotype ID of a sound source 55 existing in the traffic situation by matching a feature amount of the acquired sound data with a feature amount of sound data for each stereotype ID of the sound sources stored in the roadside database 13.

Further, the roadside recognizer 12 may estimate the position of the sound source from sounds detected by a plurality of microphones and determine a traffic object having the sound source from the estimated position of the sound source.

Presentation Control Based on Bone ID

The bone ID is a stereotype ID that identifies a displacement or state of a specific partial structure of a traffic object, such as the occurrence of a head-swinging motion of a driver of a vehicle, a rider of a bicycle, a pedestrian, or the like, a steering direction, a direction of a tire, and a direction indicated by a direction indicator (blinker).

The roadside recognizer 12 of the roadside apparatus 10 cuts out an image of the specific partial structure of the traffic object from an image captured by the roadside sensor 11 (camera). The roadside recognizer 12 recognizes the displacement and state of each partial structure by matching a feature amount of the image of the partial structure with a feature amount of each bone ID stored in the roadside database 13, and generates a bone ID.

(Traffic Situation Presentation Control Based on Stereotype ID of Sound Source and Bone ID)

Figure 7:
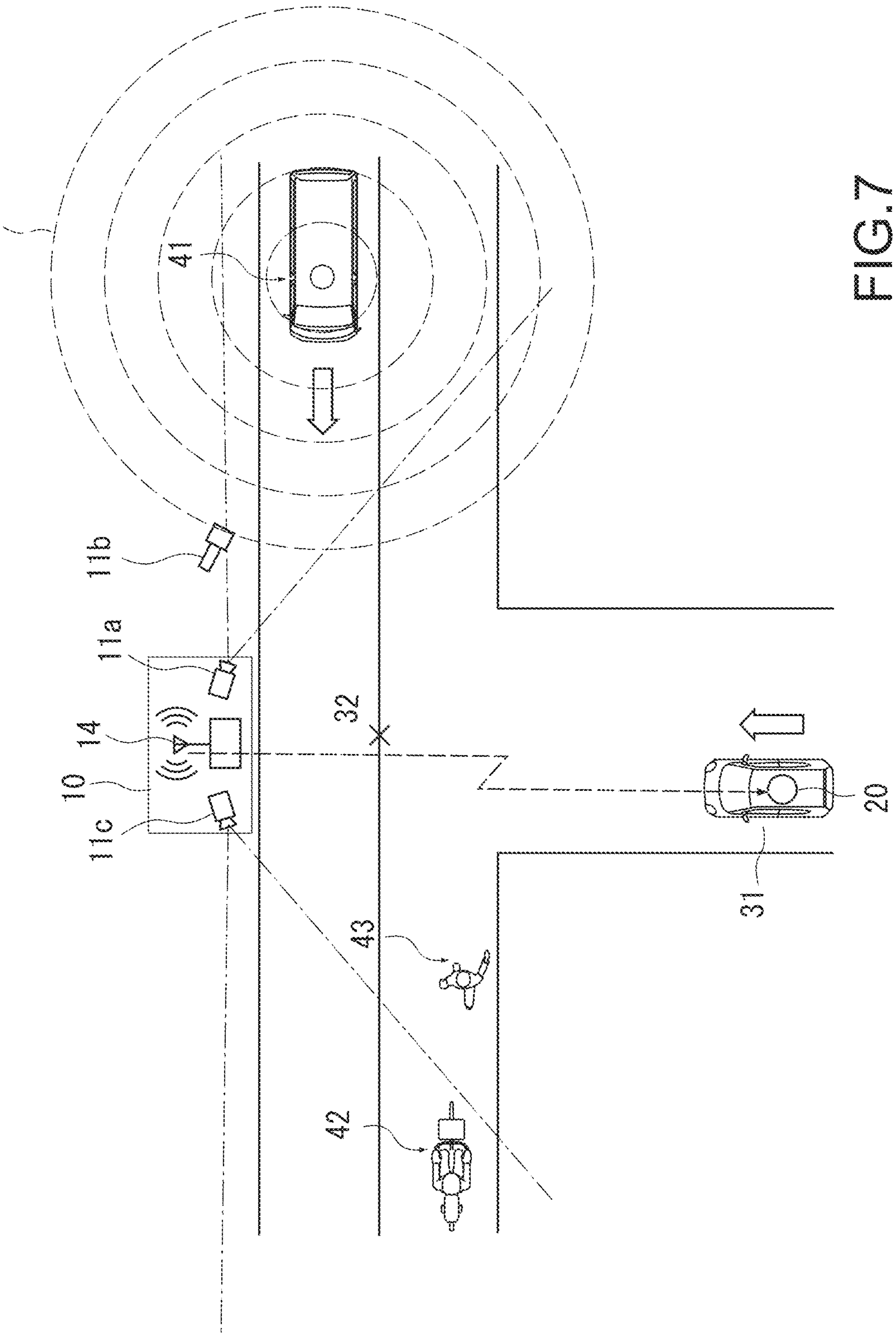
FIG. 7 is a diagram showing an example of a second traffic situation around the intersection detected by the roadside apparatus 10.

FIG. 7 is a diagram showing an example of a second traffic situation around an intersection detected by the roadside apparatus 10.

Now, an emergency vehicle 41 is about to enter the intersection 32 from the right side in the figure while emitting a siren sound 44. Further, a bicycle 42 and a pedestrian (child) 43 are approaching the intersection 32 from the left side in the figure.

The roadside recognizer 12 of the roadside apparatus 10 generates a stereotype ID and displacement information of the emergency vehicle 41, which is entering the intersection 32, from an image taken by a first camera 11*a*. In this example, since the emergency vehicle 41 is about to travel straight ahead through the intersection 32, it is assumed that there is no change in a motion of the driver's head, a steering direction, a direction of a tire, and a direction indicator (blinker) of the emergency vehicle 41. Therefore, no bone ID is generated in this case. Further, the roadside recognizer 12 generates a stereotype ID of the siren sound 44 emitted by the emergency vehicle 41 from a sound detected by a microphone 11*b*.

Further, the roadside recognizer 12 generates a stereotype ID and displacement information of the bicycle 42 approaching the intersection 32 and also generates a bone ID of a direction of the rider's face of the bicycle 42, from an image captured by a second camera 11*c*.

In addition, the roadside recognizer 12 obtains a stereotype ID and displacement information of the pedestrian (child) 43 walking toward the intersection 32 and also generates a bone ID of a direction of the face of the pedestrian (child) 43, from the image captured by the second camera 11*c*.

The roadside apparatus 10 wirelessly transmits the traffic object information of the emergency vehicle 41, the traffic object information of the bicycle 42, and the traffic object information of the pedestrian (child) 43, which are generated by the roadside recognizer 12 as described above, to the vehicle-side apparatus 20 of the user vehicle 31 using the roadside transceiver 14.

The traffic situation virtual data generator 22 of the vehicle-side apparatus 20 generates the traffic situation virtual data as follows on the basis of the traffic object information transmitted from the roadside apparatus 10, and causes the traffic situation virtual data presentation unit 24 to present the traffic situation virtual data.

Figure 8:
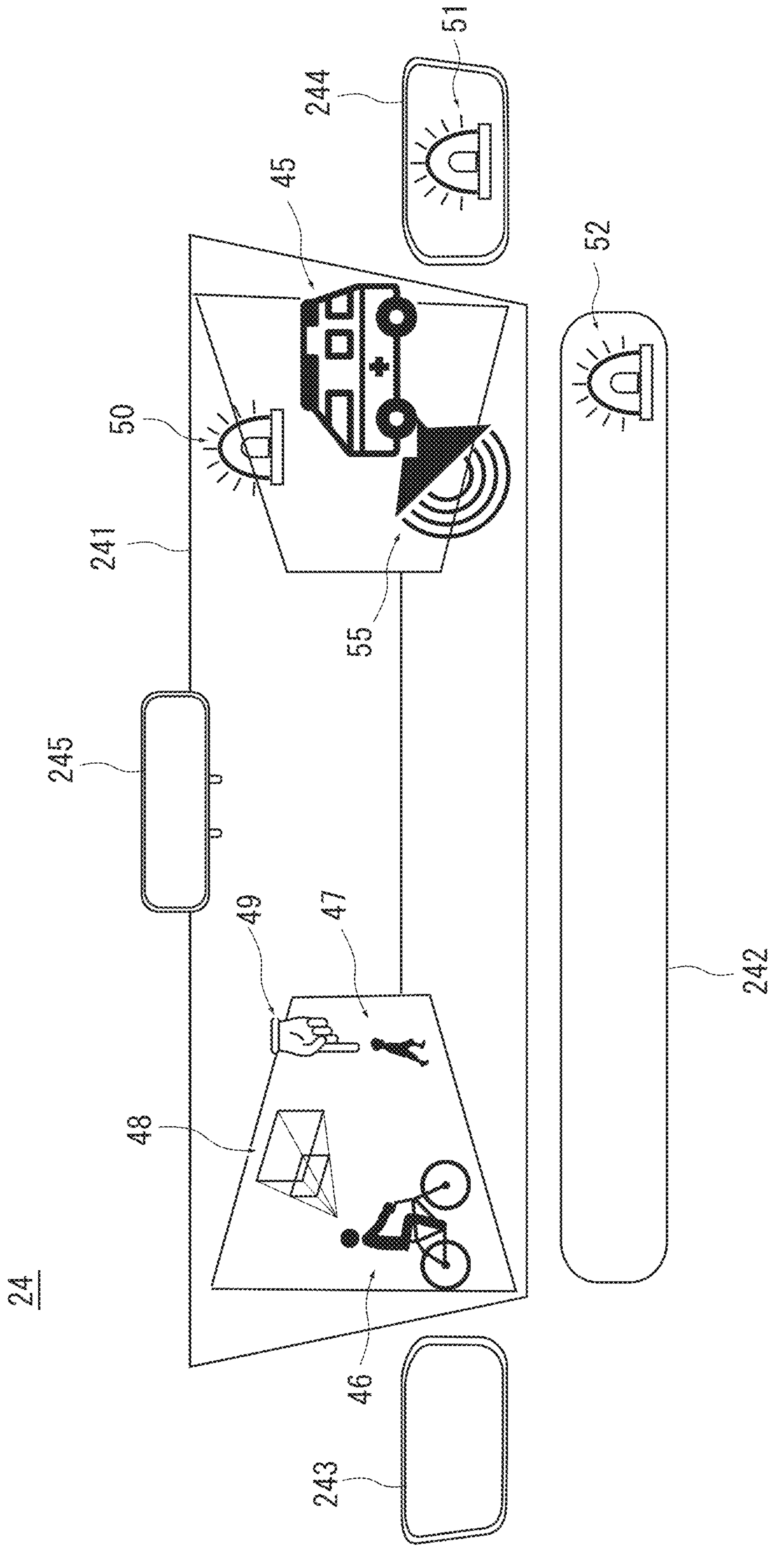
FIG. 8 is a diagram showing a presentation example of the traffic situation virtual data for the traffic situation of FIG. 7.

FIG. 8 is a diagram showing a presentation example of the traffic situation virtual data for the traffic situation of FIG. 7.

As shown in FIG. 8, the intersection model data and the traffic situation virtual data generated from traffic object model data 45 of the emergency vehicle 41, traffic object model data 46 of the bicycle 42, traffic object model data 47 of the pedestrian (child) 43, and the like are presented on the windshield monitor 241.

In conjunction with the traffic object model data 46 of the bicycle 42, a view frustum 48 indicating the direction of the rider's face is presented on the windshield monitor 241 on the basis of a bone ID indicating the direction and angle of the rider's face of the bicycle 42.

Further, if the pedestrian 43 is a child, auxiliary information 49 that alert the driver of the user vehicle 31 is presented on the windshield monitor 241 in conjunction with the traffic object model data 47 of the pedestrian (child) 43. Thus, even when the traffic object model data of each pedestrian of a child and an adult is presented in the size of a realistic ratio, the traffic object model data 47 of the child is visually recognized with ease by the driver of the user vehicle 31.

In addition, the traffic situation virtual data generator 22 causes the windshield monitor 241, the door mirror monitors 243 and 244, and the meter panel monitor 242 to present auxiliary information 50, 51, and 52 for alerting the driver of the user vehicle 31 to the fact that an emergency vehicle is approaching the intersection 32. For example, the auxiliary information 50, 51, and 52 are presented at a position close to the traffic object model data 46 of the emergency vehicle presented on the windshield monitor 241, at a position corresponding to the presentation position of the traffic object model data 46 of the emergency vehicle in the presentation space of the meter panel monitor 242, and on the door mirror monitor 244 on the side where the emergency vehicle is approaching.

If the emergency vehicle is approaching the intersection 32 from the front of the user vehicle 31, the auxiliary information may be presented at the central portion of the windshield monitor 241 and the meter panel monitor 242. If the emergency vehicle is coming close from the rear of the user vehicle 31, the auxiliary information may be presented on the rearview mirror monitor 245, the left and right door mirror monitors 243 and 244, and the like. Note that it is desirable for the user to optionally set on which monitor the auxiliary information is to be presented with respect to the positional relationship between the user vehicle 31 and the emergency vehicle.

Further, an indoor lamp of the user vehicle 31 may be used as, for example, means for alerting the driver of the user vehicle 31 to the approach or the like of a dangerous vehicle such as an emergency vehicle. In this case as well, the brightness, color, blinking speed, and the like of the indoor lamp may be varied depending on the speed or acceleration of the dangerous vehicle or the distance between the dangerous vehicle and the intersection.

The traffic situation virtual data generator 22 may read, from the vehicle-side model database 23, the sound source sound model data of the siren sound corresponding to the stereotype ID of the siren sound included in the received traffic object information, and may supply stereo acoustic data to a stereo acoustic system (not shown) mounted on the user vehicle 31. This stereo acoustic data is generated by the traffic situation virtual data generator 22 so as to be presented to the driver of the user vehicle 31 as if it were a siren sound emitted from a position in the real space of the emergency vehicle, on the basis of the displacement information (such as position information) included in the received traffic object information. Further, at that time, the auxiliary information 55 such as a sound source mark indicating that the emergency vehicle is the source of the siren sound may also be presented in conjunction with the traffic object model data 46 of the emergency vehicle presented on the windshield monitor 241. Thus, the driver of the user vehicle 31 can easily grasp that the source of the siren sound is the emergency vehicle presented as the traffic object model data 46 on the windshield monitor 241.

The roadside recognizer 12 of the roadside apparatus 10 may determine a stereotype ID of a sound source of a sound that is usually hard to hear by the driver of the user vehicle 31, such as a chain sound or a bell sound of the bicycle 42, and may add the stereotype ID to the traffic object information of the bicycle 42 to give the stereotype ID to the vehicle-side apparatus 20. The traffic situation virtual data generator 22 of the vehicle-side apparatus 20 that has acquired the traffic object information of the bicycle 42 supplies the stereo acoustic data such as the chain sound or the bell sound of the bicycle to the stereo acoustic system (not shown) and presents the data to the driver of the user vehicle 31, in a manner similar to the siren sound of the emergency vehicle. Thus, the driver of the user vehicle 31 can grasp a position of a traffic object such as a bicycle that is not in view, for example.

(End of Display of Traffic Object Model Data)

The traffic situation virtual data generator 22 calculates a timing at which the traffic object passes through the intersection on the basis of the displacement information included in the acquired traffic object information, and ends the display of the traffic object model data at that timing. The end of the display of the traffic object model data may be performed by fade-out. More specifically, the timing at which the traffic object passes through the intersection is, for example, a timing at which the traffic object finishes passing through the center of the intersection or the center of the intersection in the intersection model data presented on the windshield monitor 241. However, in consideration of safety, the display may be terminated with a delay of a predetermined time from the above-mentioned timing. The delay time may be varied according to the speed or acceleration of the traffic object.

Further, the traffic situation virtual data generator 22 predicts the lane change of the traffic object on the basis of, for example, the bone ID of the direction indicator, the bone ID of the direction of the tire, or the bone ID of the steering direction, which is included in the traffic object information, and terminates the display of the traffic object model data when it is determined that there is no possibility that the traffic object and the user vehicle 31 will intersect each other.

In a case where a real-space traffic situation within a predetermined azimuth angle from the driver's viewpoint of the user vehicle 31 is presented on the windshield monitor 241, and a real-space traffic situation outside the azimuth angle is presented on the left and right door mirror monitors 243 and 244, the presentation of the traffic object model data on the windshield monitor 241 is terminated when the presentation destination of certain traffic object model data is switched from the windshield monitor 241 to the left or right door mirror monitor 243 or 244, and vice versa.

(Presentation of Traffic Object Model Data of High-Speed Vehicle)

Figure 9:
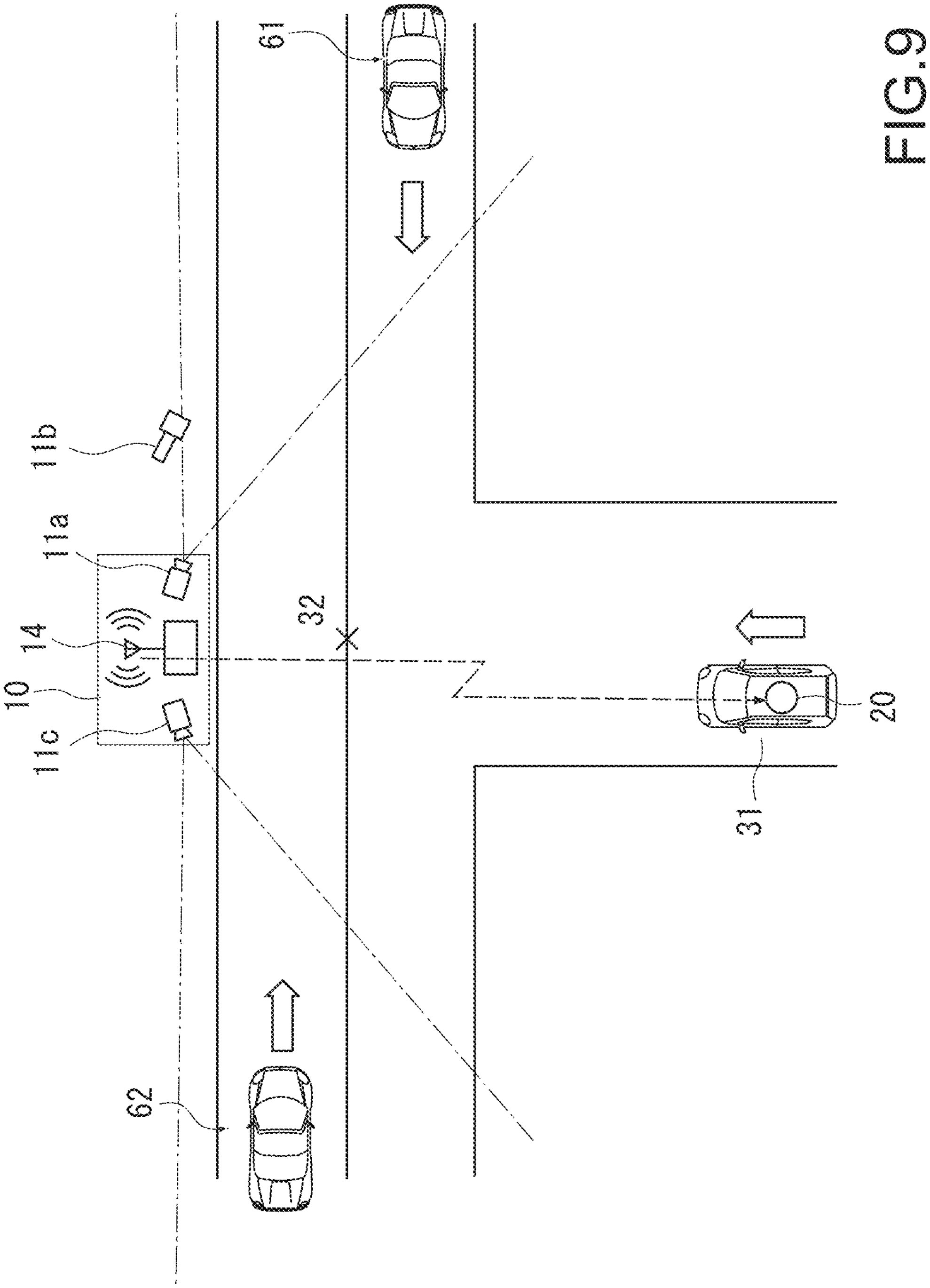
FIG. 9 is a diagram showing a traffic situation including a high-speed vehicle.

FIG. 9 is a diagram showing a traffic situation including a high-speed vehicle.

Now, medium-sized vehicles 61 and 62 are approaching the intersection 32 from the right and left in the figure. It is assumed that the speed of the medium-sized vehicle 61 approaching from the right side is higher than a threshold value, and the speed of the medium-sized vehicle 62 approaching from the left side is less than the threshold value.

The roadside recognizer 12 of the roadside apparatus 10 generates a stereotype ID and displacement information of the medium-sized vehicle 61 approaching the intersection 32 from the right side from an image captured by the first camera 11*a*, and generates traffic object information of the medium-sized vehicle 61 by adding the intersection ID. Further, the roadside recognizer 12 generates a stereotype ID and displacement information of the medium-sized vehicle 62 approaching the intersection 32 from the left side from an image captured by the second camera 11*c*, and generates traffic object information of the medium-sized vehicle 62 by adding the intersection ID. The generated two pieces of traffic object information are transmitted to the vehicle-side apparatus 20 by the roadside transceiver 14.

The traffic situation virtual data generator 22 of the vehicle-side apparatus 20 generates traffic situation virtual data as follows on the basis of the acquired traffic object information of the medium-sized vehicle 61 and the acquired traffic object information of the medium-sized vehicle 62, and causes the traffic situation virtual data presentation unit 24 to present the generated traffic situation virtual data.

Figure 10:
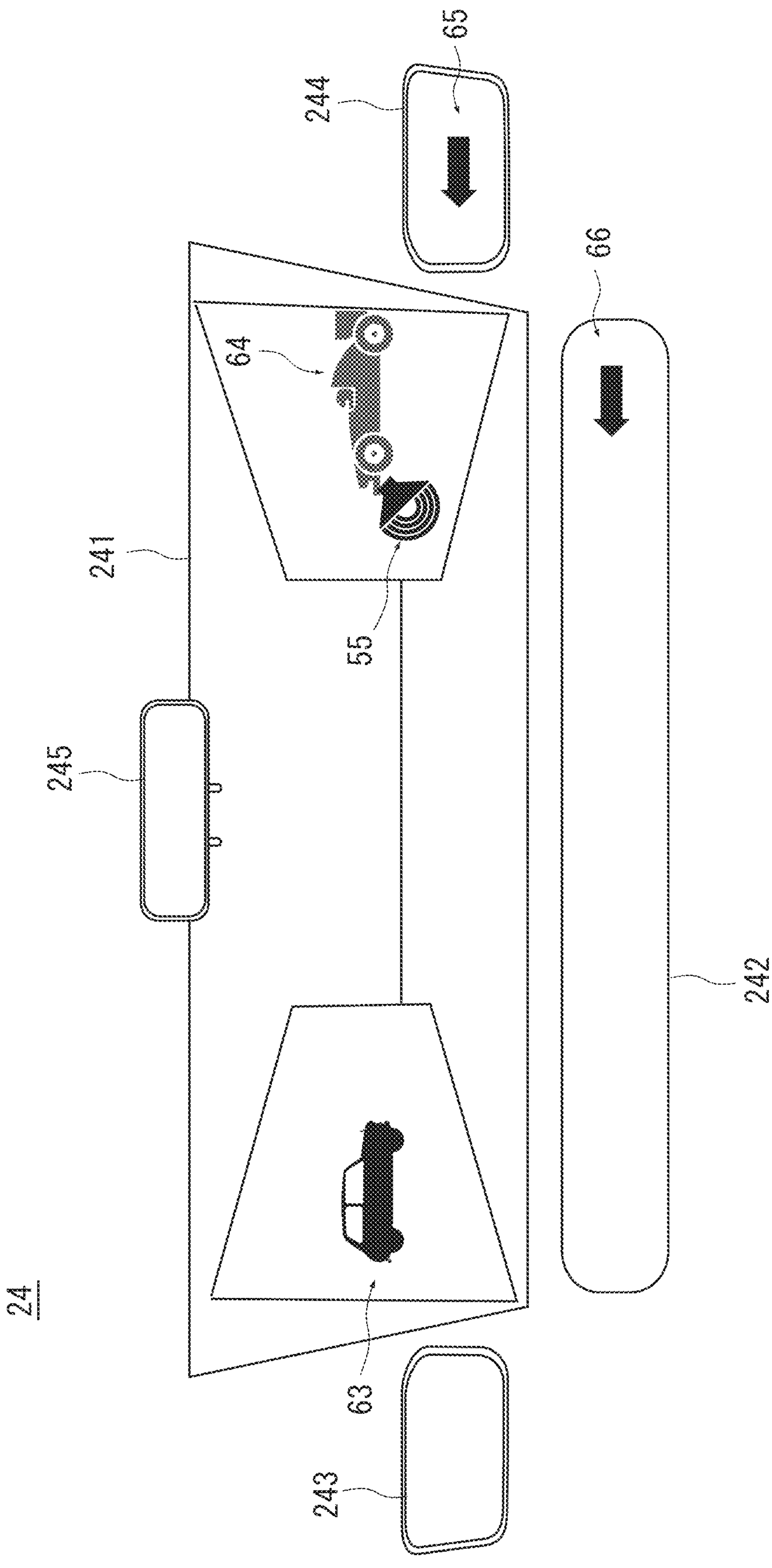
FIG. 10 is a diagram showing a presentation example of the traffic situation virtual data for the traffic situation of FIG. 9.

FIG. 10 is a diagram showing a presentation example of the traffic situation virtual data for the traffic situation of FIG. 9.

The traffic situation virtual data generator 22 reads the traffic object model data of the medium-sized vehicle from the vehicle-side model database 23 on the basis of the stereotype ID included in the traffic object information of the medium-sized vehicle 62.

Further, since the stereotype ID included in the traffic object information of the medium-sized vehicle 61 is for the medium-sized vehicle but the speed thereof exceeds the threshold value, the traffic situation virtual data generator 22 reads traffic object model data of a high-speed vehicle from the vehicle-side model database 23. As shown in FIG. 10, the traffic situation virtual data generator 22 generates traffic situation virtual data from the intersection model data, traffic object model data 63 of the medium-sized vehicle, and traffic object model data 64 of the high-speed vehicle, and causes the traffic situation virtual data presentation unit 24 to present the generated traffic situation virtual data. This can alert the driver of the user vehicle 31 to the traffic object approaching the intersection 32 at high speed.

Note that the determination condition of the high-speed vehicle may be performed on the basis of not the speed but the acceleration. Alternatively, both the speed and acceleration may be taken into consideration.

In a case where the high-speed vehicle is recognized in such a manner, for the purpose of alerting the driver of the user vehicle 31 to the high-speed vehicle approaching the intersection 32, the traffic situation virtual data generator 22 may present auxiliary information 65 and 66 such as arrows pointing in the approaching direction, for example, on the door mirror monitor 244 on the side where the high-speed vehicle is approaching, and/or in the area of the meter panel monitor 242 on the side where the high-speed vehicle is approaching.

Further, the traffic situation virtual data generator 22 may make the high-speed vehicle model data 64 more conspicuous, for example, by blinking the high-speed vehicle model data 64 presented on the windshield monitor 241. At that time, the blinking speed may be changed according to the speed or acceleration of the high-speed vehicle.

The traffic situation virtual data generator 22 may make the high-speed vehicle model data 64 presented on the windshield monitor 241 much more conspicuous by colors, changes in color, or the like. Further, the color may be determined according to the speed or acceleration, or the speed of the change in color may be changed according to the speed or acceleration of the vehicle.

The traffic situation virtual data generator 22 may change the color of the high-speed vehicle model data or the speed of change in color according to the distance between the vehicle and the intersection. The method of changing the color according to the speed of the vehicle or the distance between the vehicle and the intersection includes a method of increasing the color temperature as the speed or acceleration of the vehicle becomes higher, a method of increasing the color temperature as the distance between the vehicle and the intersection becomes shorter, and the like.

In addition, the color, size, type of image, and the like of the auxiliary information to be presented on the door mirror monitors 243 and 244 and the meter panel monitor 242 may also be changed depending on the speed or acceleration of the vehicle, or the distance between the vehicle and the intersection.

The traffic situation virtual data generator 22 may generate a synthetic sound such as engine sound to provide it to the speaker system in order to alert the driver of the user vehicle 31 to the high speed vehicle 62 approaching the intersection 32. In this case as well, the type of engine sound, the loudness of the sound, the pitch (frequency), and the like may be changed according to the speed or acceleration of the vehicle or the distance between the vehicle and the intersection. In addition, the Doppler effect may be applied to the engine sound on the basis of the distance between the vehicle and the intersection.

The synthetic output of the engine sound may be performed not only for high-speed vehicles but also for all types of vehicles. In this case, the traffic situation virtual data generator 22 may determine the type, loudness, pitch, and the like of the engine sound on the basis of the stereotype ID of the traffic object.

In the situation where the user vehicle 31 and the detected vehicle come close to each other, the actual engine sound of the detected vehicle may be heard also by the driver of the user vehicle 31, and thus the traffic situation virtual data generator 22 may terminate the synthetic output of the engine sound when the distance between the user vehicle 31 and the detected vehicle is less than a threshold value. Alternatively, the output level of the synthetic engine sound may be gradually decreased to eventually fade out as the distance between the user vehicle 31 and the detected vehicle decreases. This allows the synthetic engine sound to avoid overlapping with the actual engine sound and giving the driver an unpleasant feeling.

The presentation of the traffic situations around the intersection described above may be selectively performed, for example, only in an environment where the traffic situations around the intersection are invisible by a shielding object such as a building from the driver of the user vehicle 31. For example, the intersection ID with which the traffic situation is to be presented is stored in the vehicle-side model database 23, and thus the vehicle-side apparatus 20 is capable of determining whether to present the traffic situation. Further, this determination is favorably performed not only on an intersection basis, but also on the basis of finer areas such as the left side and the right side of the intersection when viewed from the driver of the user vehicle 31. In this case, in an environment with good visibility where a traffic object approaching the intersection is seen from the driver of the user vehicle 31, it is effective to turn off the presentation of the traffic situation of such a part. Further, traffic object model data with increased transparency may be presented at an intersection with good visibility for the driver of the user vehicle 31.

Figure 11:
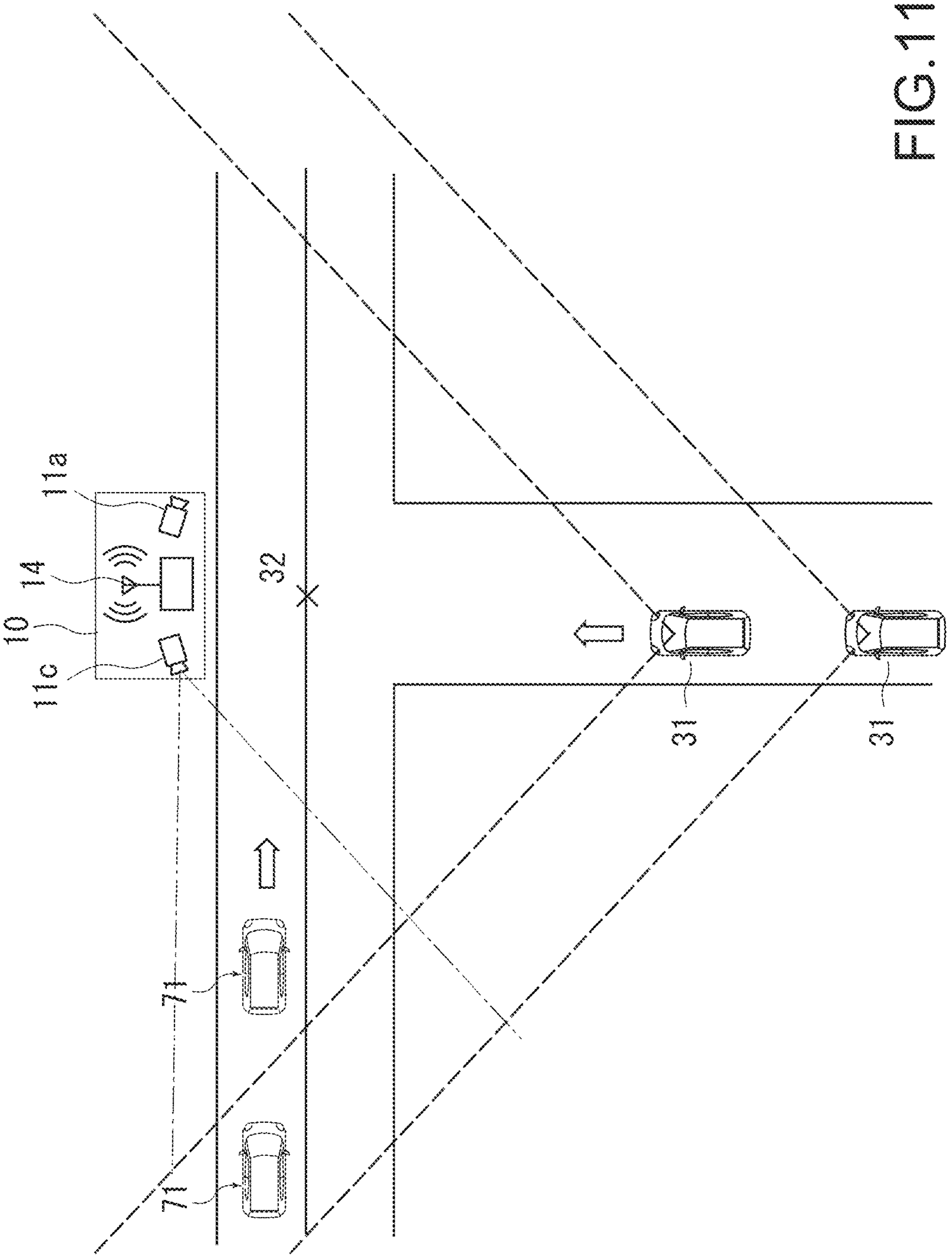
FIG. 11 is a diagram showing an example of a third traffic situation around the intersection detected by the roadside apparatus 10.

In the road-to-vehicle communication system 100 of this embodiment, as shown in FIG. 11, for example, traffic situation virtual data that models a real space within a predetermined azimuth angle from the driver's viewpoint of the user vehicle 31 is presented. In this case, the real space presented as the traffic situation virtual data becomes gradually narrower as the distance between the user vehicle 31 and the intersection 32 becomes shorter. Here, as shown in FIG. 11, in a case where the user vehicle 31 and a detected vehicle 71 approaching the intersection 32 from the left side in the figure are each traveling at a constant speed and are to intersect each other at the intersection 32 if they go on, a position of traffic object model data 72 of the detected vehicle 71 presented on the windshield monitor 241 of the traffic situation virtual data presentation unit 24 does not change much, so that there is a possibility that the detected vehicle 71 may be seen stopped from the driver of the user vehicle 31.

Figure 12:
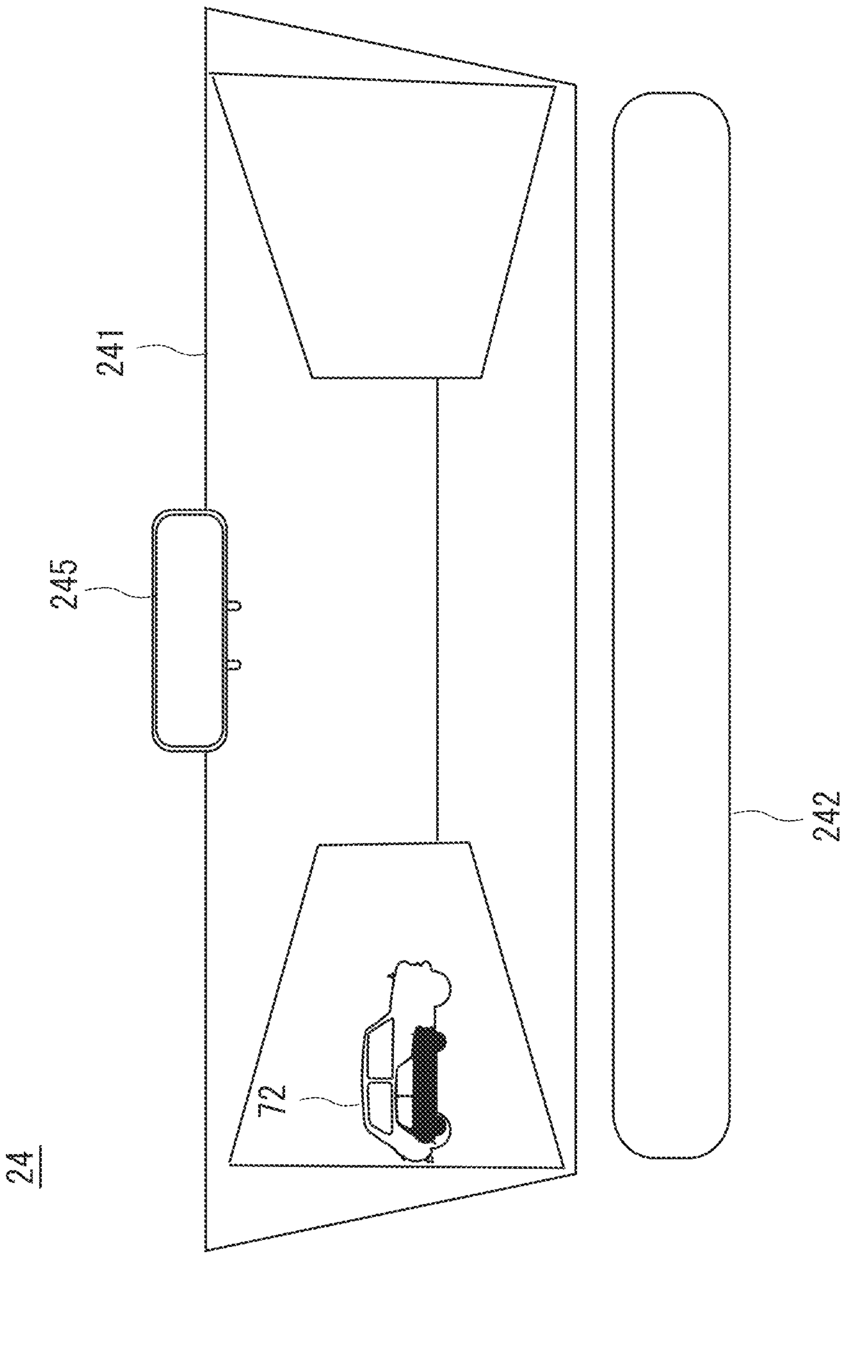
FIG. 12 is a diagram showing a presentation example of the traffic situation virtual data for the traffic situation of FIG. 11.

In the case as described above, for example, as shown in FIG. 12, the traffic situation virtual data generator 22 increases the display scale of the traffic object model data 72 of the detected vehicle 71 as the distance between the detected vehicle 71 and the intersection decreases. Note that positional information in displacement information included in the traffic object information of the detected vehicle 71 is given by a relative value to the position of the intersection, and thus the traffic situation virtual data generator 22 can uniquely obtain the distance between the detected vehicle 71 and the intersection from the positional information. Thus, the driver of the user vehicle 31 can recognize that the detected vehicle 71 is traveling toward the intersection 32 from the enlarged traffic object model data 72 of the detected vehicle 71 presented on the traffic situation virtual data presentation unit 24.

(Presentation Control for Lane Change of Detected Vehicle)

Figure 13:
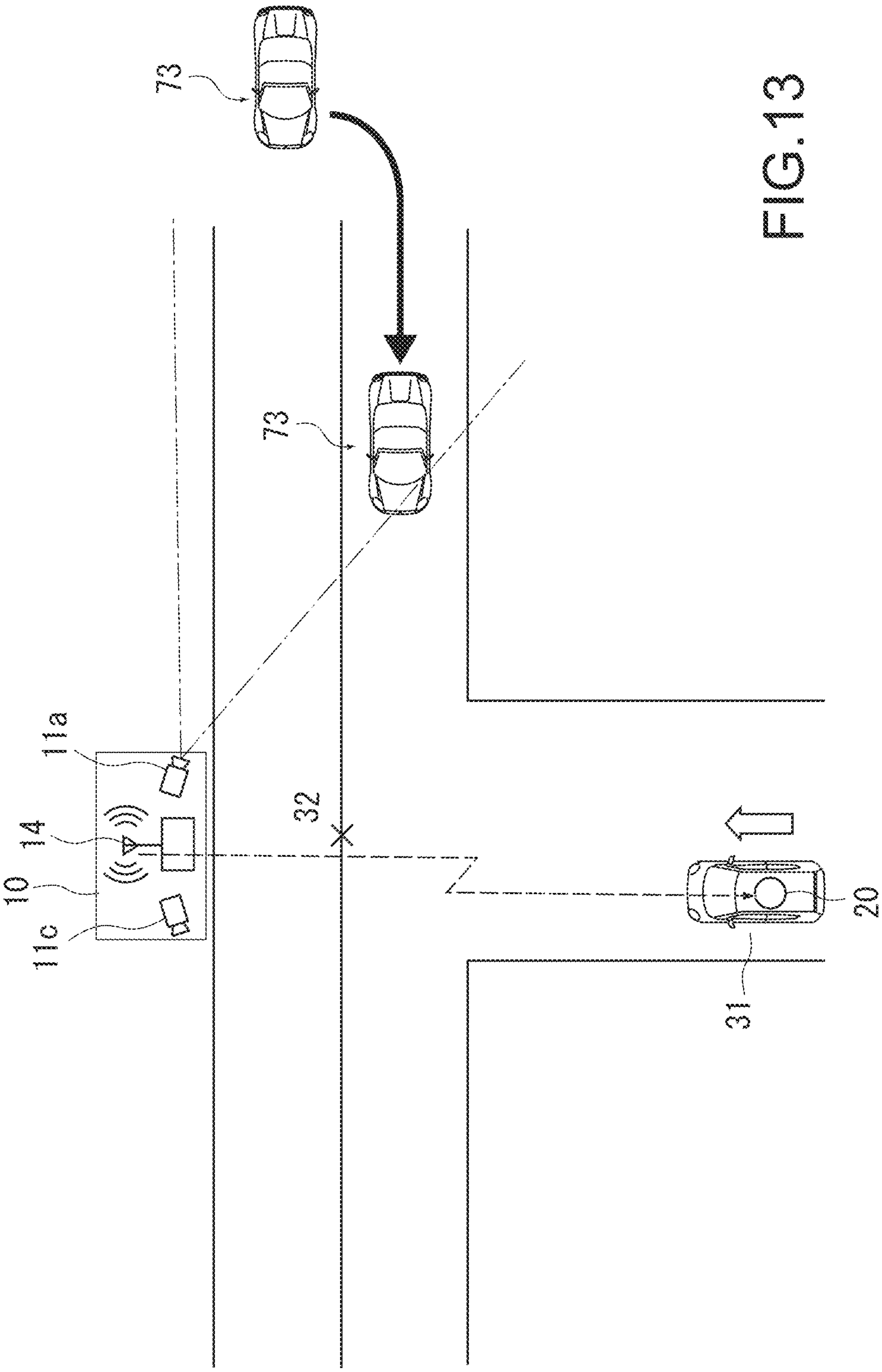
FIG. 13 is a diagram showing a fourth traffic situation including a vehicle 73 that changes a lane in the vicinity of an intersection 32.

FIG. 13 is a diagram showing a traffic situation including a vehicle 73 that performs lane change in the vicinity of the intersection 32.

In FIG. 13, it is assumed that the vehicle 73 is approaching the intersection 32 from the right side. Here, the vehicle 73 is about to change the lane from the right lane to the left lane.

The roadside recognizer 12 of the roadside apparatus 10 generates a stereotype ID, displacement information, and the like of the vehicle 73 approaching the intersection 32 from the right side, from an image captured by the first camera 11*a*. In addition, the roadside recognizer 12 generates, from the image, at least one of a bone ID indicating that the driver of the user vehicle 31 has swung the head, a bone ID indicating that the direction of the tire is inclined to the left with respect to the lane direction, a bone ID indicating that the steering is inclined to the left, or a bone ID indicating that the direction indicator (blinker) on the left side is blinking. The roadside recognizer 12 adds an intersection ID to the generated stereotype ID, displacement information, and bone ID to generate traffic object information of the vehicle 73. The roadside apparatus 10 wirelessly transmits the traffic object information of the vehicle 73 generated by the roadside recognizer 12 as described above to the vehicle-side apparatus 20 of the user vehicle 31 using the roadside transceiver 14.

Note that, in this example, any stereotype of the vehicle 73 may be used.

On the basis of the traffic object information transmitted from the roadside apparatus 10, the traffic situation virtual data generator 22 of the vehicle-side apparatus 20 generates traffic situation virtual data as follows, and causes the traffic situation virtual data presentation unit 24 to present the traffic situation virtual data.

Figure 14:
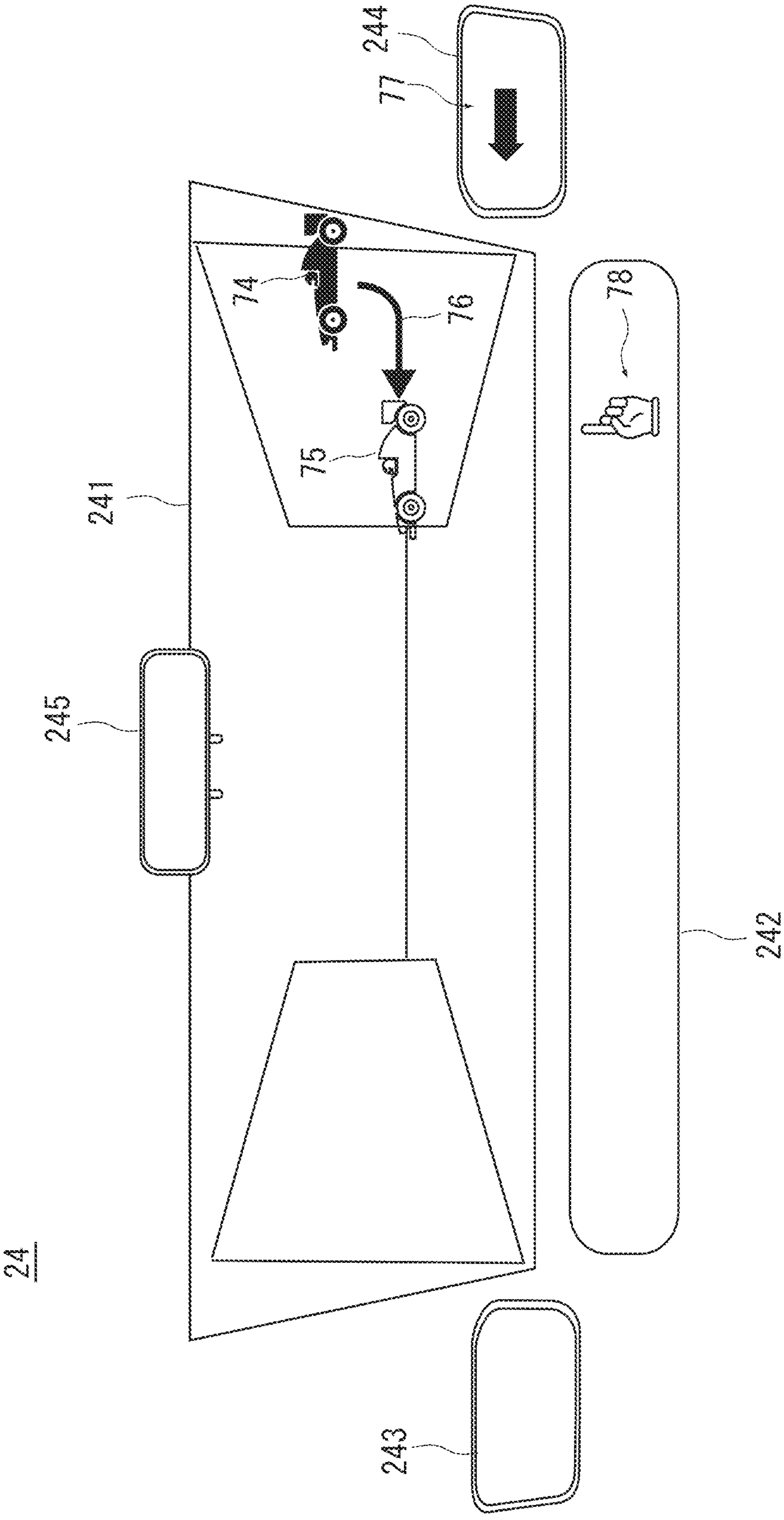
FIG. 14 is a diagram showing a presentation example of the traffic situation virtual data for the traffic situation of FIG. 13.

FIG. 14 is a diagram showing a presentation example of the traffic situation virtual data for the traffic situation of FIG. 13.

Here, since the traffic object information acquired by the traffic situation virtual data generator 22 includes the bone ID indicating at least one of that the driver of the user vehicle 31 has swung the head, that the direction of the tire is inclined to the left with respect to the traveling direction, that the steering is inclined to the left, or that the direction indicator (blinker) on the left side is blinking, the traffic situation virtual data generator 22 determines that there is a vehicle that is to move from the right lane to the left lane, and generates traffic situation virtual data including intersection model data, traffic object model data 74 of the vehicle before performing the lane change, traffic object model data 75 of the vehicle after performing the lane change, and an arrow 76 indicating the trajectory of the lane change, on the basis of the traffic object information.

Here, the traffic object model data 74 of the vehicle before performing the lane change and the traffic object model data 75 of the vehicle after performing the lane change may be the same data, or may be different in the color, transparency, or the like.

Further, in order to alert the driver of the user vehicle 31 to the vehicle 73, which has an increased risk to the user vehicle 31 due to the lane change and is approaching the intersection 32, the traffic situation virtual data generator 22 presents auxiliary information 77 such as an arrow pointing in the approaching direction on the door mirror monitor 244 on the side where the vehicle 73 is approaching. In addition, auxiliary information 78 such as a pointing mark may be presented on the meter panel monitor 242 in order to direct the line of sight of the driver of the user vehicle 31 to the presentation positions of the traffic object model data 74 and 75 before and after performing the lane change.

As described above, since the fact that the vehicle with increased risk due to the lane change is approaching the intersection is presented to the driver of the user vehicle 31 through the traffic situation virtual data presentation unit 24, it is possible to increase the traffic safety.

(Presentation Control for Vehicle Waiting to Turn Right and Following Vehicles)

Figure 15:
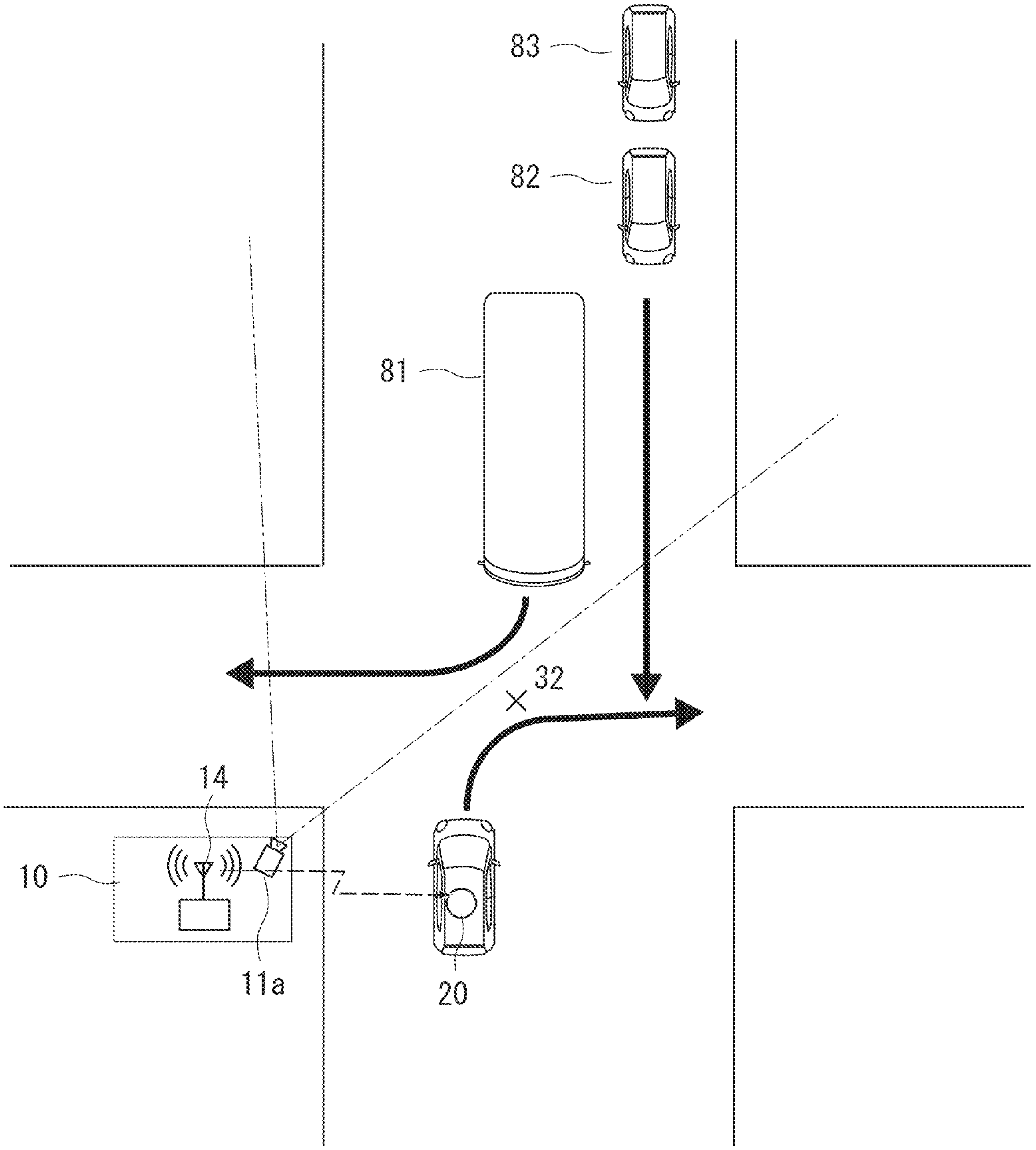
FIG. 15 is a diagram showing a fifth traffic situation including a vehicle 81 waiting to turn right and following vehicles 82 and 82 behind the vehicle 81 at the intersection.

FIG. 15 is a diagram showing a fifth traffic situation including a vehicle 81 waiting to turn right and following vehicles 82 and 82 at an intersection.

Here, the intersection 32 of a crossroad is assumed.

Now, the user vehicle 31 is waiting to turn right at the intersection 32 of the crossroad. At that time, the vehicle 81 such as a bus entering the intersection 32 from the front when viewed from the driver of the user vehicle 31 is waiting to turn right at the intersection 32. It is assumed that, behind the vehicle 81 waiting to turn right, there are two following vehicles 82 and 83 traveling straight ahead that are about to travel straight ahead through the intersection 32 along the side of the large-sized vehicle 81 waiting to turn right, and the two following vehicles 82 and 83 traveling straight ahead are located at positions that are invisible or difficult to see from the driver of the user vehicle 31 due to the large-sized vehicle 81 like a wall.

The roadside recognizer 12 of the roadside apparatus 10 recognizes the traffic situation including the large-sized vehicle 81 and the two following vehicles 82 and 83 traveling straight ahead, and generates traffic object information of each vehicle. The generated traffic object information of each vehicle is wirelessly transmitted to the vehicle-side apparatus 20 of the user vehicle 31 by the roadside transceiver 14.

The traffic situation virtual data generator 22 of the vehicle-side apparatus 20 generates traffic situation virtual data as follows on the basis of the traffic object information of each vehicle transmitted from the roadside apparatus 10, and causes the traffic situation virtual data presentation unit 24 to present the traffic situation virtual data.

Figure 16:
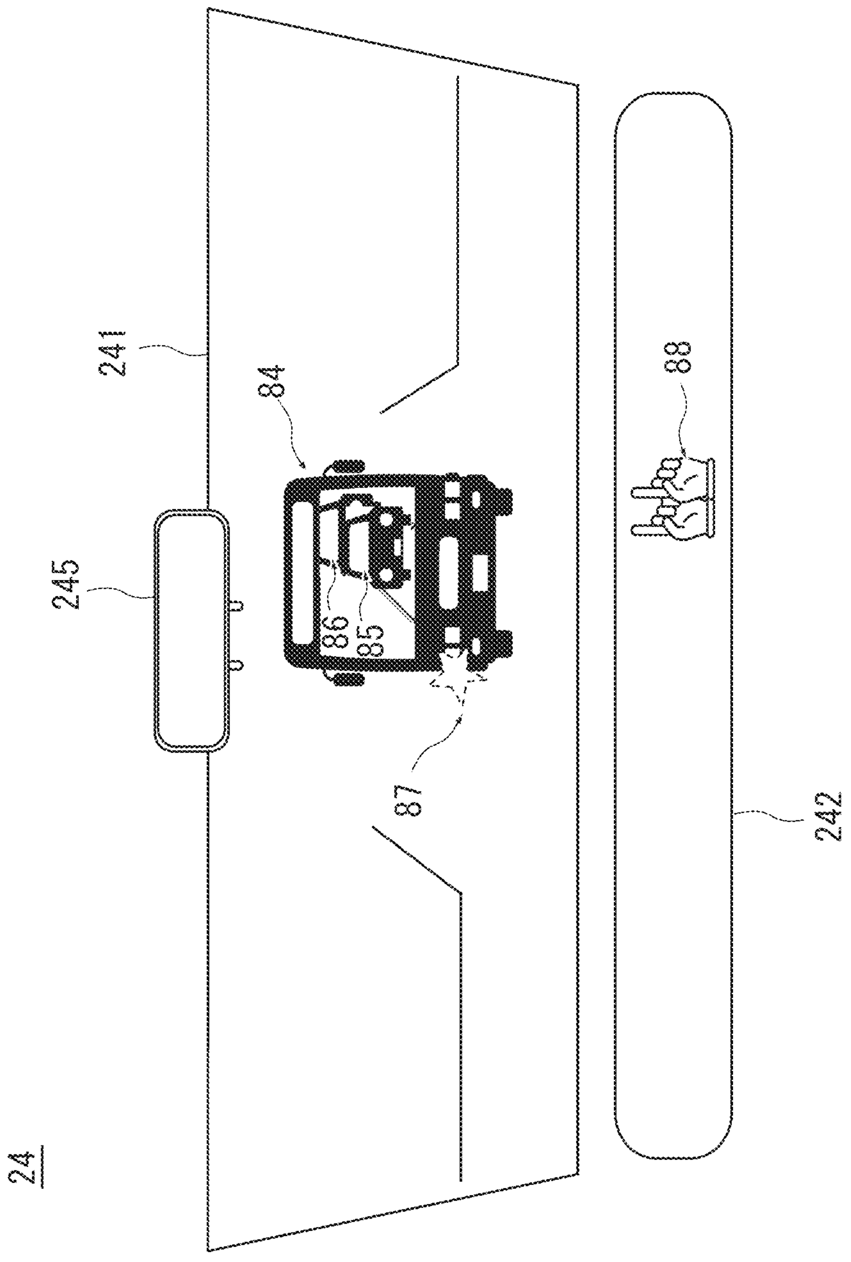
FIG. 16 is a diagram showing a presentation example of the traffic situation virtual data for the traffic situation of FIG. 15.

FIG. 16 is a diagram showing a presentation example of the traffic situation virtual data for the traffic situation of FIG. 15.

On the basis of the traffic object information of each vehicle, the traffic situation virtual data generator 22 recognizes that the two following vehicles 82 and 83 traveling straight ahead are in the positions invisible or difficult to see from the driver of the user vehicle 31 due to the large-sized vehicle 81 waiting to turn right. In this case, as shown in FIG. 16, the traffic situation virtual data generator 22 superimposes and presents traffic object model data 85 and 86 of the two following vehicles 82 and 83 traveling straight ahead on traffic object model data 84 of the large-sized vehicle 81 waiting to turn right. At that time, the traffic situation virtual data generator 22 superimposes the traffic object model data 84, 85, and 86 of the respective vehicles 81, 82, and 83 on one another as if the vehicles 81, 82, and 83 in the real space were seen through from the driver of the user vehicle 31 on the basis of the displacement information included in the traffic object information of each vehicle. FIG. 16 shows an example in which each of the traffic object model data 85 and 86 of the following vehicles 82 and 83 traveling straight ahead is disposed on the traffic object model data 84 of the large-sized vehicle 81 waiting to turn right on the windshield surface.

Thus, the driver of the user vehicle 31 can grasp the presence of the following vehicles 82 and 83 traveling straight ahead that are hidden and invisible or difficult to see by the large-sized vehicle 81 from the traffic situation virtual data presented on the traffic situation virtual data presentation unit 24, and can perform the right turn of the user vehicle 31 more safely.

Note that in the presentation control described above, the vehicle waiting to turn right is not necessarily a "large-sized vehicle" and may be a vehicle of another stereotype. The traffic object model data of the following vehicle traveling straight ahead may be superimposed on the body portion, the windshield portion, or the like of the traffic object model data of the vehicle waiting to turn right. Further, superimposition may be performed such that at least a portion of the traffic object model data of the following vehicle traveling straight ahead protrudes from the traffic object model data of the vehicle waiting to turn right.

The traffic object model data of the following vehicle traveling straight ahead, which is superimposed on the traffic object model data of the vehicle waiting to turn right, may be data with reduced definition or data with reduced amount of information to the extent that the driver can grasp the presence of the following vehicle traveling straight ahead. This is because, if the entire data is too cluttered by the superimposition of the traffic object model data, the presence or the number of the following vehicles traveling straight ahead may become difficult to understand.

Further, when detecting a starting operation of the own vehicle (user vehicle 31) regardless of the presence of the following vehicles traveling straight ahead that is approaching the intersection 32, the traffic situation virtual data generator 22 may alert the driver of the user vehicle 31 so as to apply the braking of the vehicle by causing the stereo acoustic speaker system to emit a virtual horn sound from the front. If an automatic driving system is mounted on the vehicle, the traffic situation virtual data generator 22 may instruct the automatic driving system to perform braking.

Note that, in the presentation of the traffic object model data of the vehicle 81 waiting to turn right shown in FIG. 16, the fact that the vehicle 81 is waiting to turn right may be presented to the driver of the user vehicle 31 by blinking 87 of the direction indicator in the traffic object model data.

In addition, the number of the following vehicles 82 and 83 traveling straight ahead present after the vehicle 81 waiting to turn right may be displayed by, for example, a display device such as an indicator provided to the meter panel monitor 242.

(Presentation Control for Traffic Situation of Imaging Incapable Area)

Figure 17:
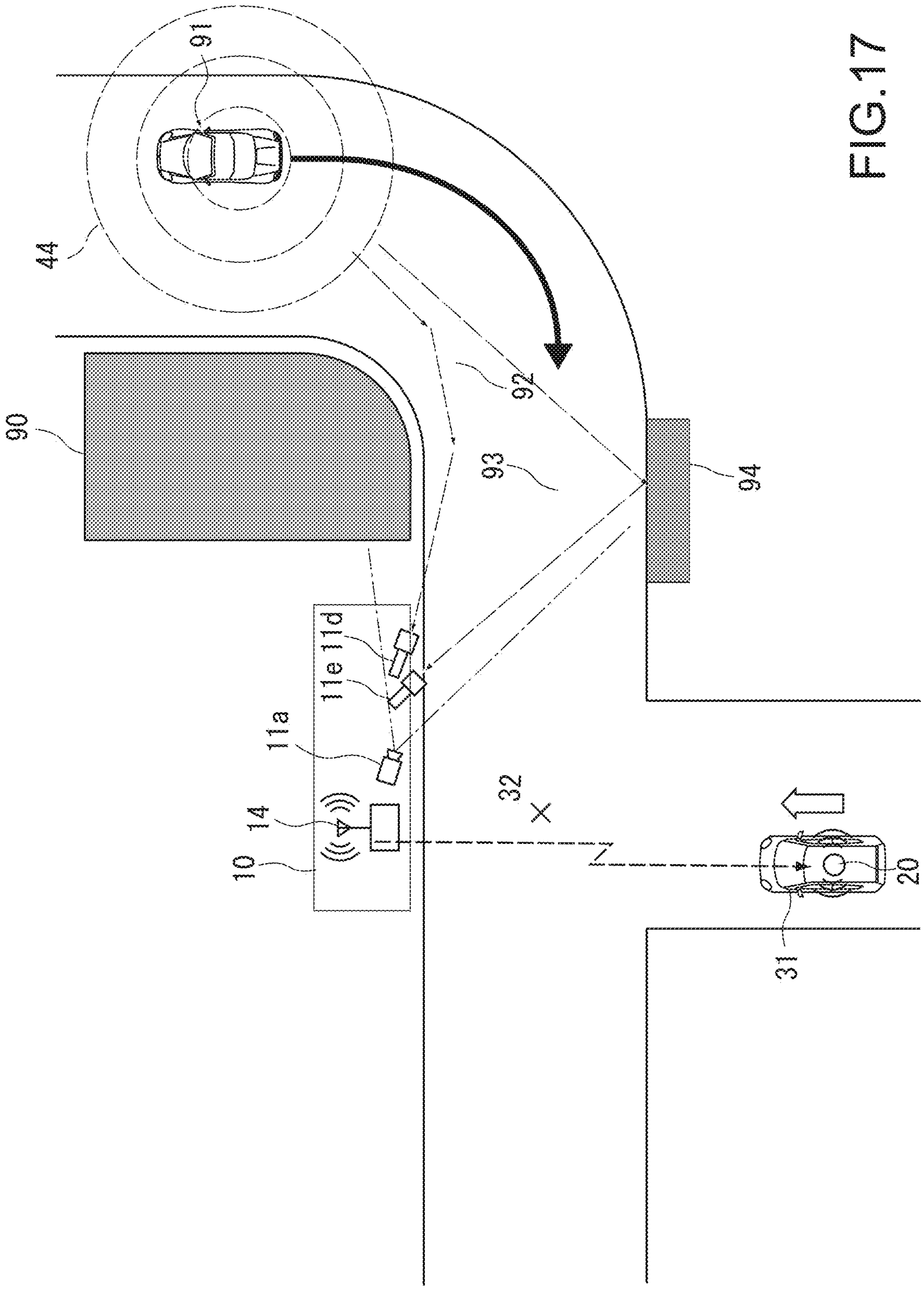
FIG. 17 is a diagram showing a sixth traffic situation of an intersection including an imaging incapable area.

FIG. 17 is a diagram showing a traffic situation at an intersection including an imaging incapable area.

Here, it is assumed that there is an area incapable of imaging by the camera 11*a* of the roadside apparatus 10 due to the presence of a shielding object 90 such as a road shape or a building.

In such a condition, a first microphone 11*d* and a second microphone 11*e* are used. The first microphone 11*d* has a directivity with respect to a diffracted sound 92, which is obtained when a sound 92 such as an engine sound emitted from a vehicle 91 located in an area incapable of imaging by the camera 11*a* has arrived along the road while avoiding the shielding object 90. The second microphone 11*e* has a directivity with respect to a reflected sound 94, which is obtained when the sound 92 from the vehicle 91 has arrived by reflection on a shielding object 93. Each directivity of the first microphone 11*d* and the second microphone 11*e* is selected in consideration of the shielding condition for each intersection.

A signal of the sound collected by each of the microphones 11*d* and 11*e* is supplied to the roadside recognizer 12. The roadside recognizer 12 generates time-series data of the feature amounts of the respective sounds (diffracted sound 92 and reflected sound 94). The roadside recognizer 12 generates diffracted sound information by combining the generated time-series data of the feature amount of the diffracted sound 92 and a sensor ID of the first sensor 11*d*. In addition, the roadside recognizer 12 generates reflected sound information by combining the generated time-series data of the feature amount of the reflected sound 93 and a sensor ID of the second sensor 11*e*.

Note that, as the feature amount of the sound, for example, a spectrum, a cepstrum, an envelope, or the like is used.

In addition, the roadside recognizer 12 generates a stereotype ID of the traffic object on the basis of the feature amount of the sound.

The roadside recognizer 12 generates, as traffic object information, the stereotype ID of the traffic object, the diffracted sound information, the reflected sound information, and the intersection ID obtained as described above. The generated traffic object information is wirelessly transmitted to the vehicle-side apparatus 20 by the roadside transceiver 14 of the roadside apparatus 10.

On the basis of the traffic object information transmitted from the roadside apparatus 10, the traffic situation virtual data generator 22 of the vehicle-side apparatus 20 generates traffic situation virtual data as follows, and causes the traffic situation virtual data presentation unit 24 to present the traffic situation virtual data.

The traffic situation virtual data generator 22 calculates displacement information including a position, a moving direction, a speed, and acceleration of the vehicle 91 on the basis of the time-series data of the feature amount of the diffracted sound 92 and the time-series data of the feature amount of the reflected sound 93, which are included in the traffic object information. Further, the traffic situation virtual data generator 22 reads the traffic object model data on the basis of the stereotype ID included in the received traffic object information, generates the traffic situation virtual data from the traffic object model data, the intersection model data, and the like, and presents the generated traffic situation virtual data on the traffic situation virtual data presentation unit 24.

Figure 18:
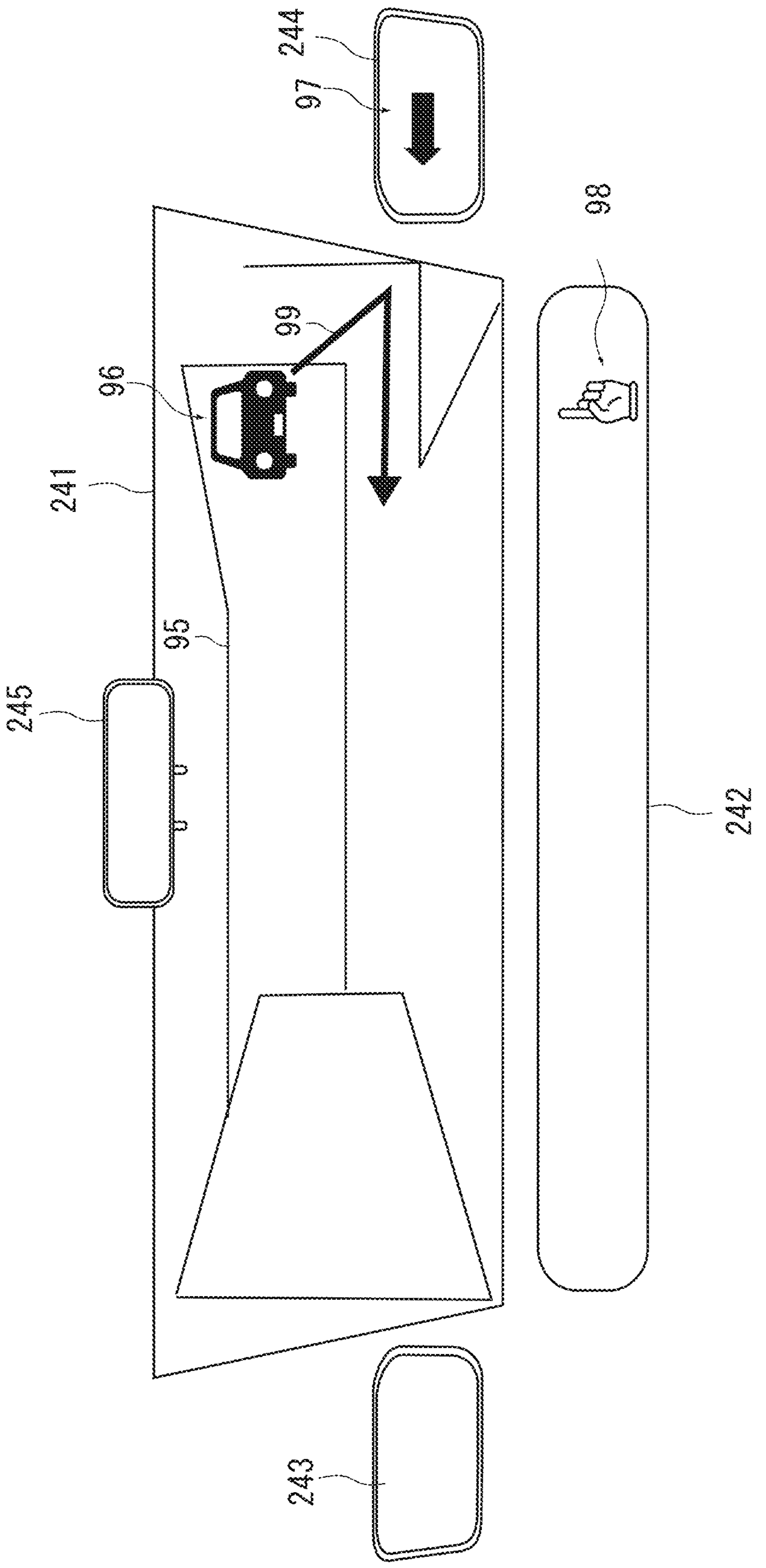
FIG. 18 is a diagram showing a presentation example of the traffic situation virtual data for the traffic situation of FIG. 17.

FIG. 18 is a diagram showing a presentation example of the traffic situation virtual data for the traffic situation of FIG. 17.

As shown in FIG. 18, the intersection model data includes shielding object model data 95. As shown in FIG. 17, in a case where the vehicle 91 in the real space that is approaching the intersection 32 is present in the imaging incapable area of the camera 11*a* due to the shielding object 92, traffic object model data 96 of the vehicle 91 is presented so as to be superimposed on the shielding object model data 95, and in addition, an arrow 99 indicating the trajectory of the traffic object model data 96 of the vehicle 91 is presented. Thus, the driver of the user vehicle 31 can grasp that the vehicle 91, which is invisible by the shielding object 90, is approaching the intersection 32 though not seen by the driver. This improves the traffic safety.

Note that, at that time, the traffic situation virtual data generator 22 presents auxiliary information 97 such as an arrow pointing in the approaching direction on the door mirror monitor 244 on the side where the vehicle 91, which is invisible by the shielding object 90, is approaching. In addition, auxiliary information 98 such as a pointing mark may be presented on the meter panel monitor 242 in order to direct the line of sight of the driver of the user vehicle 31 to the presentation position of the traffic object model data 96 of the vehicle 91, which is invisible by the shielding object 90.

Note that the present technology may take the following configurations.

(1) A roadside apparatus for road-to-vehicle communication, including:

a roadside sensor that detects a road situation;

a recognizer that recognizes a traffic object from the road situation detected by the roadside sensor and converts a result of the recognition into stereotype information of the traffic object; and a transmitter that transmits and receives the stereotype information.

(2) The roadside apparatus for road-to-vehicle communication according to (1), in which the recognizer further recognizes a position and a displacement amount of the traffic object.

(3) The roadside apparatus for road-to-vehicle communication according to (1) or (2), in which the transmitter receives the stereotype information from a vehicle in the road situation.

(4) The roadside apparatus for road-to-vehicle communication according to any one of (1) to (3), in which the roadside sensor includes a microphone, and the recognizer recognizes a sound source of a sound detected by the microphone and converts a result of the recognition into the stereotype ID stereotype information.

(5) The roadside apparatus for road-to-vehicle communication according to any one of (1) to (4), in which the recognizer recognizes a displacement or a state of a partial structure of the traffic object and converts a result of the recognition into the stereotype information.

(6) The roadside apparatus for road-to-vehicle communication according to (5), in which the displacement or the state of the partial structure of the traffic object is one of a head-swinging motion of a driver, a steering direction, a direction of a tire, and a state of a direction indicator in a case where the traffic object is a vehicle.

(7) The roadside apparatus for road-to-vehicle communication according to (5), in which the displacement or the state of the partial structure of the traffic object is a direction of a face of a rider in a case where the traffic object is a bicycle.

(8) A vehicle-side apparatus for road-to-vehicle communication, including:

a data storage unit that stores data regarding a traffic object corresponding to stereotype information;

a receiver that receives the stereotype information; and a presentation unit that presents the data stored in the data storage unit on the basis of the received stereotype information.

(9) The vehicle-side apparatus for road-to-vehicle communication according to (8), in which the presentation unit presents the data on a windshield of a vehicle.

(10) The vehicle-side apparatus for road-to-vehicle communication according to (8) or (9), in which the presentation unit presents the data on a door mirror of a vehicle.

(11) The vehicle-side apparatus for road-to-vehicle communication according to any one of (8) to (10), in which the receiver receives a stereotype ID of a sound source, and the presentation unit presents a synthetic sound corresponding to the received stereotype ID of the sound source.

(12) The vehicle-side apparatus for road-to-vehicle communication according to any one of (8) to (11), in which the receiver receives displacement information of the traffic object, and the presentation unit varies the synthetic sound on the basis of the received displacement information.

(13) The vehicle-side apparatus for road-to-vehicle communication according to any one of (8) to (12), in which the receiver receives displacement information of the traffic object, and the presentation unit presents the data stored in the data storage unit on the basis of the received stereotype information and the displacement information.

REFERENCE SIGNS LIST

10 roadside apparatus
11 roadside sensor
12 roadside recognizer
13 roadside database
14 roadside transceiver
20 vehicle-side apparatus
21 vehicle-side receiver
22 traffic situation virtual data generator
23 vehicle-side model database

24 traffic situation virtual data presentation unit
100 road-to-vehicle communication system

The invention claimed is:

1. A roadside apparatus, comprising:

a sensor configured to detect a road situation; and at least one processor configured to:

recognize a traffic object and one of a displacement or a state of a partial structure of the traffic object from the road situation detected by the sensor;

convert a result of the recognition into stereotype information of the traffic object; and transmit the stereotype information, wherein the one of the displacement or the state of the partial structure of the traffic object includes movement of one of a vehicle or a body of an operator of the vehicle, and the movement of one of the vehicle or the body of the operator of the vehicle is one of a head-swinging motion of a driver, a steering direction, a direction of a tire, or a state of a direction indicator.

2. The roadside apparatus according to claim 1, wherein the at least one processor is further configured to recognize a position and a displacement amount of the traffic object.

3. The roadside apparatus according to claim 1, wherein the at least one processor is further configured to receive the stereotype information from the vehicle in the road situation.

4. The roadside apparatus according to claim 1, wherein the sensor includes a microphone, and the at least one processor is further configured to:

recognize a sound source of a sound detected by the microphone, and convert a result of the recognition of the sound source into stereotype information of the sound source.

5. The roadside apparatus according to claim 1, wherein the movement of one of the vehicle or the body of the operator of the vehicle is a direction of a face of a rider in a case where the vehicle is a bicycle.

6. A vehicle-side apparatus, comprising:

a data storage unit configured to store data regarding a traffic object corresponding to first stereotype information; and at least one processor configured to:

receive second stereotype information associated with the traffic object and one of a displacement or a state of a partial structure of the traffic object; and present the data stored in the data storage unit based on the received second stereotype information, wherein the one of the displacement or the state of the partial structure of the traffic object includes movement of one of a vehicle or a body of an operator of the vehicle, and the movement of one of the vehicle or the body of the operator of the vehicle is one of a head-swinging motion of a driver, a steering direction, a direction of a tire, or a state of a direction indicator.

7. The vehicle-side apparatus according to claim 6, wherein the at least one processor is further configured to present the data on a windshield of a vehicle.

8. The vehicle-side apparatus according to claim 6, wherein the at least one processor is further configured to present the data on a door mirror of a vehicle.

9. The vehicle-side apparatus according to claim 6, wherein the at least one processor is further configured to:

receive a stereotype ID of a sound source, and present a synthetic sound corresponding to the received stereotype ID of the sound source.

10. The vehicle-side apparatus according to claim 9, wherein the at least one processor is further configured to:

receive displacement information of the traffic object, and vary the synthetic sound based on the received displacement information.

11. The vehicle-side apparatus for road-to-vehicle communication according to claim 9, wherein the at least one processor is further configured to:

receive displacement information of the traffic object, and present the data stored in the data storage unit based on the received second stereotype information and the displacement information.

12. A road-to-vehicle communication system, comprising:

a roadside apparatus that includes:

a sensor configured to detect a road situation;

at least one processor configured to:

recognize a traffic object and one of a displacement or a state of partial structure of the traffic object from the road situation detected by the sensor;

convert a result of the recognition into first stereotype information of the traffic object;

transmit the first stereotype information, wherein the one of the displacement or the state of the partial structure of the traffic object includes movement of one of a vehicle or a body of an operator of the vehicle, and the movement of one of the vehicle or the body of the operator of the vehicle is one of a head-swinging motion of a driver, a steering direction, a direction of a tire, or a state of a direction indicator; and a vehicle-side apparatus that includes:

a data storage unit configured to store data regarding the traffic object corresponding to second stereotype information; and at least one processor configured to:

receive the first stereotype information transmitted by the roadside apparatus; and present the data stored in the data storage unit based on the received first stereotype information.

* * * * *